United States Patent
Wirola et al.

(10) Patent No.: US 9,188,661 B2
(45) Date of Patent: Nov. 17, 2015

(54) DETERMINING A POSITION OF A TERMINAL

(75) Inventors: Lauri Aarne Johannes Wirola, Tampere (FI); Tommi Antero Laine, Tampere (FI); Matti Samuli Raitoharju, Tampere (FI); Niilo Torsten Sirola, Tampere (FI)

(73) Assignee: Nokia Technologies Oy, Espoo (FI)

(*) Notice: Subject to any disclaimer, the term of this patent is extended or adjusted under 35 U.S.C. 154(b) by 280 days.

(21) Appl. No.: 13/264,588

(22) PCT Filed: Apr. 17, 2009

(86) PCT No.: PCT/US2009/002411
§ 371 (c)(1),
(2), (4) Date: Oct. 14, 2011

(87) PCT Pub. No.: WO2010/120264
PCT Pub. Date: Oct. 21, 2010

(65) Prior Publication Data
US 2012/0028652 A1 Feb. 2, 2012

(51) Int. Cl.
*G01S 5/14* (2006.01)
*G01S 5/02* (2010.01)

(52) U.S. Cl.
CPC *G01S 5/14* (2013.01); *G01S 5/0252* (2013.01)

(58) Field of Classification Search
CPC ....... H04W 64/00; H04W 4/02; H04W 4/025; H04L 29/08657; G01S 5/0242; G01S 5/0252; G01S 5/14; G01S 5/0226; G01S 5/00
USPC ............. 455/404.2, 414.1–414.2, 456.1–457, 455/421; 340/539.13
See application file for complete search history.

(56) References Cited

U.S. PATENT DOCUMENTS

| | | | |
|---|---|---|---|
| 5,365,516 A | 11/1994 | Jandrell | |
| 6,745,036 B1 | 6/2004 | Dunne et al. | |
| 2001/0053698 A1* | 12/2001 | Karmi et al. | 455/456 |
| 2004/0067759 A1* | 4/2004 | Spirito et al. | 455/456.1 |
| 2004/0198386 A1* | 10/2004 | Dupray | 455/456.1 |
| 2005/0192031 A1* | 9/2005 | Vare | 455/456.6 |
| 2005/0261004 A1* | 11/2005 | Dietrich et al. | 455/456.2 |
| 2006/0114145 A1 | 6/2006 | Chu et al. | |
| 2006/0217131 A1 | 9/2006 | Alizadeh-Shabdiz et al. | |

(Continued)

OTHER PUBLICATIONS

Hermann, S.D. et al., "Enhancing the Accuracy of Position Information through Superposition of Location Server Data", Proceedings of the 2007 IEEE International Conference on Communications, pp. 2030-2037.

(Continued)

*Primary Examiner* — Michael Mapa
(74) *Attorney, Agent, or Firm* — Locke Lord LLP

(57) ABSTRACT

It is disclosed an apparatus, a method and a computer program for determining a position of a terminal. It is checked if an intersection of all areas of a set of areas that are associated with one or more communication nodes and represent and/or limit possible positions of a terminal is potentially non-empty. Each of the areas is associable with a respective bounding box. The intersection is defined to be potentially non-empty if an intersection of all of the bounding boxes would be non-empty. A position of the terminal is determined in dependence on a result of the checking if the intersection of all areas of the set of areas is potentially non-empty.

20 Claims, 10 Drawing Sheets

(56) References Cited

U.S. PATENT DOCUMENTS

2006/0240840 A1    10/2006  Morgan et al.
2009/0005064 A1*   1/2009   Malik et al. ................ 455/456.1
2009/0215470 A1*   8/2009   Bowyer et al. ............. 455/456.3

OTHER PUBLICATIONS

Supplementary European Search Report and Examination Report for European Application No. EP 09843427—Date of Completion of Search: Aug. 22, 2012, 7 pages.

* cited by examiner

DETERMINING A POSITION OF A TERMINAL

THE NAMES OF THE PARTIES TO A JOINT RESEARCH AGREEMENT

The claimed invention was made by or on behalf of Tampere University of Tampere, Finland and Nokia Corporation of Espoo, Finland as parties to a joint research agreement that was in effect on or before the date the claimed invention was made.

FIELD

This invention relates to determining a position of a terminal.

BACKGROUND

As an alternative or add-on to satellite-based positioning systems, positioning systems in which a present position of a terminal is estimated based on a list of communication nodes (such as for instance cellular base stations, access points or beacons) that can presently be heard by the terminal and a database that contains identifiers and positions of the communication nodes and/or models for the coverage areas for a number of communication nodes have gained recent interest.

Given that the communication node positions are known and distances from the terminal to the communication nodes can be estimated, the terminal's position can for instance be estimated through triangulation. Distances between a terminal and the heard communication nodes can for instance be estimated based on the path loss using a channel model (i.e. how much the signal attenuates between the terminal and the communication node) or based on timing (or round-trip timing) measurements (i.e. information expressing how long signals propagate between terminal and communication node).

Alternatively or additionally, if the coverage areas of the communication nodes are known, then a terminal may pick the coverage areas for the heard communication nodes and determine its own position based on these coverage areas.

SUMMARY OF SOME EXEMPLARY EMBODIMENTS OF THE INVENTION

When determining a position of a terminal based on a set of coverage areas that may contain one or more erroneous coverage areas, a situation may be faced where the intersection of all coverage areas of the set of coverage areas is empty. It may then be questionable which coverage areas should be considered and/or how these considered coverage areas should contribute to the determining of the position of the terminal.

According to a first aspect of the present invention, an apparatus is disclosed, comprising a processor configured to check if an intersection of all areas of a set of areas that are associated with one or more communication nodes and represent and/or limit possible positions of a terminal is potentially non-empty, wherein each of the areas of the set of areas is associable with a respective bounding box, and wherein the intersection is defined to be potentially non-empty if an intersection of all of the bounding boxes would be non-empty; the processor further being configured to determine a position of the terminal in dependence on a result of the checking whether the intersection of all areas of the set of areas is potentially non-empty.

The processor may for instance be implemented in hardware alone, may have certain aspects in software alone, or may be a combination of hardware and software. An exemplary embodiment of the processor may comprise a memory, wherein instructions executed by the processor may be transferable to the memory and/or contained in the memory. The memory may for instance store a program according to the fourth aspect of the present invention described below, or at least parts thereof.

According to a second aspect of the present invention, further an apparatus is disclosed, comprising means for checking if an intersection of all areas of a set of areas that are associated with one or more communication nodes and represent and/or limit possible positions of a terminal is potentially non-empty, wherein each of the areas of the set of areas is associable with a respective bounding box, and wherein the intersection is defined to be potentially non-empty if an intersection of all of the bounding boxes would be non-empty; and means for determining a position of the terminal in dependence on a result of the checking whether the intersection of all areas of the set of areas is potentially non-empty.

Therein, the means for checking and the means for determining may for instance be embodied as a joint processor or by respective single processors, but the means are not limited to processors.

The apparatuses according to the first and second aspect of the present invention may for instance be embodied as a module. They may for instance comprise a user interface and/or an antenna. They may for instance be embodied as a portable electronic device, such as for instance a communication device and/or a positioning/navigation device.

According to a third aspect of the present invention, furthermore a method is disclosed, comprising checking if an intersection of all areas of a set of areas that are associated with one or more communication nodes and represent and/or limit possible positions of a terminal is potentially non-empty, wherein each of the areas of the set of areas is associable with a respective bounding box, and wherein the intersection is defined to be potentially non-empty if an intersection of all of the bounding boxes would be non-empty; and determining a position of the terminal in dependence on a result of the checking whether the intersection of all areas of the set of areas is potentially non-empty.

According to a fourth aspect of the present invention, further a program is disclosed, comprising program code for performing the method according to the third aspect of the present invention and all exemplary embodiments thereof, when the program is executed on a processor.

The program may for instance be distributed via a network, such as for instance the Internet. The program may for instance be stored or encoded on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device. The readable medium may for instance be a tangible medium, for instance a tangible storage medium.

According to the above-described aspects of the present invention, a communication node may for instance be a communication node of a communication system. It may then for instance provide coverage for one or more terminals. The communication system may be a wireless or a wire-bound communication system, and may be of cellular or non-cellular type. The communication node may for instance be a one-directional or bi-directional communication node. Non-limiting examples of the communication node are thus a cellular base station, a Wireless Local Area Network (WLAN) access point, an FM radio station, a TV station. The communication node may be fixed (i.e. stationary) or mobile, for instance with low mobility and/or velocity. In case of sectorization of cells, each sector may also be understood as a communication node, even if all sectors are controlled by the same (cellular) base station.

The terminal the position of which is to be determined may for instance be fixed (i.e. stationary) or mobile, and may be embodied in various types of devices allowing for communication with one or more communication nodes (of one or more different communication systems such as cellular communication systems and WLAN communication systems), such as for instance a mobile phone, a personal digital assistant, a navigation/positioning device, a (laptop) computer or netbook, to name but a few non-limiting examples.

The areas in the set of areas are associated with one or more communication nodes and represent and/or limit possible positions of the terminal the position of which is to be determined.

For instance, such an area may represent a coverage area of a communication node, which may be understood as a region within which one or more terminals are able to receive signals sent from a communication node at least with a pre-determined minimum quality (for instance with a quality that allows a terminal to receive and decode signals sent by the communication node, such as for instance a broadcast channel, or with a quality that allows a terminal to be able to decode an identification of the communication node (e.g. a MAC address or any other type of communication node identification)), wherein the quality may for instance be expressed in terms of signal strength or signal-to-noise-ratio, to name but a few examples. In case of a wireless communication node, the coverage area may for instance depend on the transmission frequency and the propagation environment, which may for instance cause shadowing. The coverage area does not necessarily have to be continuous, it may equally well have recesses and may equally well consist of several sub-areas. The coverage area for a communication node may for instance be derived analytically, for instance based on propagation models, and/or may be determined based on one or more terminals that report their position when being able to "hear" the communication node, so that the distribution of the reported positions is then representative of the coverage area of the communication node. Therein, a terminal may for instance be considered to "hear" a communication node if it is able to receive one or more signals, which are sent by the communication node, with a pre-defined minimum quality, wherein the quality may for instance be defined in terms of a signal-to-noise ratio or a signal-to-noise and interference ratio. An example of such a signal sent by a communication node may for instance be a broadcast channel. As an alternative, the terminal may for instance be considered to "hear" a communication node if the terminal is capable of at least partially receiving and correctly decoding one or more signals sent by the communication node, such as a broadcast channel. For instance, the terminal may be considered to "hear" the communication node if it is at least able to decode an identification of the communication node (e.g. a MAC address or any other type of communication node identification). The information which communication nodes a terminal can hear may for instance result from a scanning/sniffing operation performed by the terminal. An area in the set of areas may represent a coverage area in a way that the outer boundary of the area and the outer boundary of the coverage area are the same. The area may thus for instance be understood as a hard limit for the coverage area. Equally well, an area in the set of areas may represent a statistical interpretation of a coverage area. An example of such an interpretation is expressing the coverage area in terms of a multi-normal distribution. For instance, an area in the set of areas may be considered to only describe a sub-set of the coverage area, for instance a $\sigma$-area in case that positions are assumed to be distributed in the coverage area according to a 2D Gaussian distribution. In any of these cases, the area thus can be considered to represent and/or limit possible positions of terminals associable with the respective communication node of the area, and thus also of the terminal the position of which is to be determined.

An area in the set of areas may equally well be related to a distance between a communication node and the terminal the position of which is to be determined. The distance may for instance be derived from timing information (such as Timing Advance, TA measurements) or path loss information. Such information may for instance be measured by the terminal the position of which is to be determined. A boundary of the area may then for instance be determined in dependence on this distance, so that the area then can be considered to limit the possible positions of the terminal, since positions outside the boundary of the area are not considered as possible positions for the terminal (without however necessarily requiring that the entire area within the boundary represents possible positions for the terminal, since the region of possible terminal positions may for instance only form a part of the area). For instance, the area may be a region (e.g. a circle) that represents a maximum distance the terminal can presently have with respect to the communication node associated with the area with respect to the terminal's distance measurement. In case of a TA measurement, the outer boundary of the circle or ring of possible terminal positions represented by the TA measurement may then correspond to the outer boundary of the area.

Some or all areas in the set of areas may be two-dimensional (2D) areas. A 2D area may for instance be an area that is defined with respect to two orthogonal dimensions only. The areas in the set of areas may then for instance all lie or be assumed to lie in the same 2D plane. Non-limiting examples of 2D areas are ellipses (including circles as special cases) and polygons (inter alia including triangles, rectangles and hexagons as special cases). Equally well, some or all areas in the set of areas may be three-dimensional (3D) areas. Therein, a 3D area may for instance be an area that is defined with respect to three mutually orthogonal dimensions. Non-limiting examples of 3D areas are ellipsoids (including spheres as special cases) or polyhedrons (inter alia including boxes as special cases). Also a specific positioning of a plane area in 3D space may be considered as a 3D area (for instance, a plane (2D) area that is elevated by a specific height and/or tilted by a specific angle).

The areas in the set of areas may all be associated with different communication nodes. Equally well, two or more areas may be associated with the same communication node; for instance, a first area may represent a coverage area of a communication node, and a second area may represent, for a TA measurement of the terminal the position of which is to be determined, the maximum possible distance to the communication node. The one or more communication nodes associated with the areas may be of the same communication system, but equally well also of different communication systems.

Information on the set of areas may for instance be obtained prior to the checking, for instance in the form of models describing the areas. The models may for instance describe the boundary of the areas as geometrical shapes, such as for instance ellipses (with a circle as a special case) or polygons (with triangles, rectangles, hexagons, etc. as special cases) in case of 2D areas. If the areas are coverage areas of communication nodes, models for these areas may for instance be obtained from a storage unit, which may, with respect to a unit that performs the checking and determining, be local or remote. If the areas are related to or representative of a distance of the terminal to a communication node, the model for the area may be determined locally or by a remote unit.

The set of areas may for instance contain coverage areas of those communication nodes that can presently be heard by the terminal the position of which is to be determined, and/or an area that is related to or representative of a distance of the terminal the position of which is to be determined with respect to a communication node, in particular the terminal's serving communication node. Equally well, the set of areas may only contain a subset of these areas. For instance, specific areas may be excluded, for instance because they are considered to be erroneous.

It is checked, if an intersection of all areas of the set of areas is potentially non-empty. An intersection is potentially non-empty if the intersection of the bounding boxes that are respectively associable with the areas in the set of areas would be non-empty. Therein, in case of a 2D area, a bounding box for an area may be understood as the minimum rectangle enclosing the area. Then also the intersection may be a 2D intersection. Therein, the bounding box may have to obey an orientation constraint that requires that a first and a second side of the rectangle have to be parallel to a first axis of a pre-defined coordinate system, and that a third and a fourth side of the rectangle have to be parallel to a second axis of the pre-defined coordinate system. The pre-defined coordinate system may be the same for all bounding boxes. In case of a 3D area, a bounding box for an area may be understood as the minimum rectangular cuboid enclosing the area. Then also the intersection may be a 3D intersection. Therein, the bounding box may have to obey an orientation constraint that requires that four parallel sides of the rectangular cuboid have to be parallel to a first axis of a pre-defined coordinate system, that four further parallel sides of the rectangular cuboid have to be parallel to a second axis of the pre-defined coordinate system, and that four further parallel sides of the rectangular cuboid have to be parallel to a third axis of the pre-defined coordinate system.

Therein, it may not necessarily be required to actually determine the bounding boxes in the checking, it may be sufficient to determine if their intersection is non-empty.

In dependence on the result of the checking if the intersection of all areas of the set of areas is potentially non-empty, the position of the terminal is determined.

According to the first, second, third and fourth aspects of the present invention, thus rather than directly determining an intersection of all areas in the set of areas and determining a position of the terminal from this intersection, it is first checked if an intersection of all areas of the set of areas is potentially non-empty, and the determining of the position of the terminal then depends on a result of this checking. Therein, presence of a potentially non-empty intersection means that, if an intersection exists, it lies within the intersection of the bounding boxes. In contrast, absence of a potentially non-empty intersection means that no intersection exists. Algorithms for determining the position of the terminal may thus be chosen or adapted accordingly to take the result of this checking into account, without however requiring to explicitly determine whether an intersection of all areas in the set of areas exists or not, which may be—in particular in case of complex-shaped areas—a computationally expensive task.

According to an exemplary embodiment of all aspects of the present invention, the check if an intersection of all areas of the set of areas is potentially non-empty is based on a coordinate system, which defines a first axis and a second axis being orthogonal to the first axis, and comprises:

determining, for each area in the set of areas, the largest coordinate component with respect to the first axis and selecting the smallest of these largest coordinate components as a first value; determining, for each area in the set of areas, the smallest coordinate component with respect to the first axis and selecting the largest of these smallest coordinate components as a second value;

determining, for each area in the set of areas, the largest coordinate component with respect to the second axis and selecting the smallest of these largest coordinate components as a third value; determining, for each area in the set of areas, the smallest coordinate component with respect to the second axis and selecting the largest of these smallest coordinate components as a fourth value; and considering the intersection to be potentially non-empty if the first value is larger than or equal to the second value, and the third value is larger than or equal to the fourth value.

For instance, the first axis may represent a north-south direction, and the second axis may represent a west-east direction. The first value may then represent the south-most point of a set that contains the respective north-most point of each area in the set of areas, the second value may then represent the north-most point of a set that contains the respective south-most point of each area in the set of areas, the third value may then represent the east-most point of a set that contains the respective west-most point of each area in the set of areas and the fourth value may then represent the west-most point of a set that contains the respective east-most point of each area in the set of areas. Therein, the first and second value define the intersection of the bounding boxes of all areas of the set of areas with respect to the first axis, and the third and fourth values define the intersection of the bounding boxes of all areas of the set of areas with respect to the second axis.

In case of 3D areas, the check if an intersection of all areas of the set of areas is potentially non-empty may be based on a coordinate system, which defines a first axis, a second axis and a third axis being mutually orthogonal, and may comprise: determining, for each area in the set of areas, the largest coordinate component with respect to the first axis and selecting the smallest of these largest coordinate components as a first value; determining, for each area in the set of areas, the smallest coordinate component with respect to the first axis and selecting the largest of these smallest coordinate components as a second value;

determining, for each area in the set of areas, the largest coordinate component with respect to the second axis and selecting the smallest of these largest coordinate components as a third value; determining, for each area in the set of areas, the smallest coordinate component with respect to the second axis and selecting the largest of these smallest coordinate components as a fourth value;

determining, for each area in the set of areas, the largest coordinate component with respect to the third axis and selecting the smallest of these largest coordinate components as a fifth value; determining, for each area in the set of areas, the smallest coordinate component with respect to the third axis and selecting the largest of these smallest coordinate components as a sixth value; and considering the intersection to be potentially non-empty if the first value is larger than or equal to the second value, the third value is larger than or equal to the fourth value and the fifth value is larger than or equal to the sixth value.

For instance, the first axis may represent a north-south direction, the second axis may represent a west-east direction, and the third axis may represent a height/altitude.

According to an exemplary embodiment of all aspects of the present invention, the determining of the position of the terminal comprises determining a focus area; and determining the position of the terminal based on the focus area. In case of 2D areas, the focus area may be a 2D area. In case of 3D areas, the focus area may be a 3D area.

At least the determining of the focus area may exemplarily depend on the result of the checking whether the intersection of all areas of the set of areas is potentially non-empty.

In the following, some examples for the determining of the focus area will be presented.

In case that the intersection of all areas of the set of areas is found to be potentially non-empty, the focus area may exemplarily be determined to represent the intersection of all of the bounding boxes associable with the areas of the set of areas. Since a finding that an intersection potentially exists means that, if an intersection exists, it is within the intersection of the bounding boxes, the intersection of the bounding boxes can be considered as a suited basis for determining the position of the terminal. The position of the terminal may for instance be determined from the focus area as the centre thereof, or may be determined from the focus area by numerical integration.

In case that the intersection of all areas of the set of areas is not found to be potentially non-empty, the determining of the focus area may exemplarily comprise excluding one or more areas from the set of areas to obtain a reduced set of areas; checking if an intersection of all areas of the reduced set of areas is potentially non-empty, wherein each of the areas of the reduced set of areas is associable with a respective bounding box, and wherein the intersection is defined to be potentially non-empty if an intersection of all of the bounding boxes associable with the areas of the reduced set of areas would be non-empty; and determining, in case that the intersection of all areas of the reduced set of areas is found to be potentially non-empty, the focus area to represent the intersection of all of the bounding boxes associable with the areas of the reduced set of areas.

Therein, a decision if an area shall be excluded from the set of areas may for instance be based on a type of the area. For instance, an area that is related to or representative of a distance of the terminal with respect to a communication node, such as for instance an area that indicates, based on a timing measurement of the terminal, the maximum possible distance of the terminal from a communication node, may be decided to be excluded if the intersection of all areas of the set of areas is not found to be potentially non-empty. Equally well, a decision if an area shall be excluded from the set of areas may be based on information associated with the area, for instance information on the quality and/or maturity of a model for the area.

Alternatively, in case that the intersection of all areas of the set of areas is not found to be potentially non-empty, the focus area may exemplarily be determined based on a coordinate system, which defines a first axis and a second axis being orthogonal to the first axis, and the determining of the focus area may exemplarily comprise: choosing a variable n equal to 2; selecting, as a first value, the n-th smallest coordinate component with respect to the first axis from a set containing, for each area in the set of areas, the largest coordinate component with respect to the first axis; selecting, as a second value, the n-th largest coordinate component with respect to the first axis from a set containing, for each area in the set of areas, the smallest coordinate component with respect to the first axis; selecting, as a third value, the n-th smallest coordinate component with respect to the second axis from a set containing, for each area in the set of areas, the largest coordinate component with respect to the second axis; selecting, as a fourth value, the n-th largest coordinate component with respect to the second axis from a set containing, for each area in the set of areas, the smallest coordinate component with respect to the second axis; checking if the first value is larger than or equal to the second value and the third value is larger than or equal to the fourth value; forming the focus area as a rectangle the sides of which are defined by the first and second value with respect to the first axis and by the third and fourth values with respect to the second axis, if the first value is larger than or equal to the second value and the third value is larger than or equal to the fourth value; and increasing n and repeating the selecting and checking otherwise, until a focus area is formed.

For instance, the first axis may represent a north-south direction, and the second axis may represent a west-east direction. For n=2, the first value may then represent the second south-most point of a set that contains the respective north-most point of each area in the set of areas, the second value may then represent the second north-most point of a set that contains the respective south-most point of each area in the set of areas, the third value may then represent the second east-most point of a set that contains the respective west-most point of each area in the set of areas and the fourth value may then represent the second west-most point of a set that contains the respective east-most point of each area in the set of areas.

Thus if there is no potentially non-empty intersection of all areas in the set of areas, instead of excluding areas from the set of areas, it is attempted (by increasing n) to find a non-empty focus area, which is the case if the first value is larger than or equal to the second value, and the third value is larger than or equal to the fourth value. At least if n equals the number of areas in the set of areas, a non-empty focus area corresponding to be bounding box for the union of all areas in the set of areas will be obtained.

Correspondingly, in case of 3D areas, in case that the intersection of all areas of the set of areas is not found to be potentially non-empty, the focus area may exemplarily be determined based on a coordinate system, which defines a first axis, a second axis and a third axis being mutually orthogonal, and the determining of the focus area may exemplarily comprise: choosing a variable n equal to 2; selecting, as a first value, the n-th smallest coordinate component with respect to the first axis from a set containing, for each area in the set of areas, the largest coordinate component with respect to the first axis; selecting, as a second value, the n-th largest coordinate component with respect to the first axis from a set containing, for each area in the set of areas, the smallest coordinate component with respect to the first axis; selecting, as a third value, the n-th smallest coordinate component with respect to the second axis from a set containing, for each area in the set of areas, the largest coordinate component with respect to the second axis; selecting, as a fourth value, the n-th largest coordinate component with respect to the second axis from a set containing, for each area in the set of areas, the smallest coordinate component with respect to the second axis; selecting, as a fifth value, the n-th smallest coordinate component with respect to the third axis from a set containing, for each area in the set of areas, the largest coordinate component with respect to the third axis; selecting, as a sixth value, the n-th largest coordinate component with respect to the third axis from a set containing, for each area in the set of areas, the smallest coordinate component with respect to the third axis; checking if the first value is larger than or equal to the second value, the third value is larger than or equal to the fourth value, and the fifth value is larger than or equal to the sixth value; forming the focus area as a rectangular cuboid the sides of which are defined by the first and second value with respect to the first axis, by the third and fourth values with respect to the second axis and by the fifth and sixth value with respect to the third axis, if the first value is larger than or equal to the second value, the third value is larger than or equal to the fourth value and the fifth value is larger than or equal to the sixth value; and increasing n and repeating the selecting and checking otherwise, until a focus area is formed.

For instance, the first axis may represent a north-south direction, the second axis may represent a west-east direction, and the third axis may represent a height/altitude.

Further alternatively, in case that the intersection of all areas of the set of areas is not found to be potentially non-empty, the focus area may exemplarily be determined based on a coordinate system, which defines a first axis and a second axis being orthogonal to the first axis, and the determining of the focus area may exemplarily comprise:

if a first value representing the smallest coordinate component with respect to the first axis from a set containing, for each area in the set of areas, the largest coordinate component with respect to the first axis is larger than or equal to a second value representing the largest coordinate component with respect to the first axis from a set containing, for each area in the set of areas, the smallest coordinate component with respect to the first axis, maintaining the first value and the second value, and otherwise: choosing a variable n equal to 2; checking if the n-th smallest coordinate component with respect to the first axis from a set containing, for each area in the set of areas, the largest coordinate component with respect to the first axis is larger than or equal to the n-th largest coordinate component with respect to the first axis from a set containing, for each area in the set of areas, the smallest coordinate component with respect to the first axis; if the checking is positive, maintaining the n-th smallest coordinate component as the first value and maintaining the n-th largest coordinate value as the second value, if the checking is negative, incrementing n and repeating the checking, until the first and second value can be maintained;

if a third value representing the smallest coordinate component with respect to the second axis from a set containing, for each area in the set of areas, the largest coordinate component with respect to the second axis is larger than or equal to a fourth value representing the largest coordinate component with respect to the second axis from a set containing, for each area in the set of areas, the smallest coordinate component with respect to the second axis, maintaining the third value and the fourth value, and otherwise: choosing a variable m equal to 2; checking if the m-th smallest coordinate component with respect to the second axis from a set containing, for each area in the set of areas, the largest coordinate component with respect to the second axis is larger than or equal to the m-th largest coordinate component with respect to the second axis from a set containing, for each area in the set of areas, the smallest coordinate component with respect to the second axis; if the checking is positive, maintaining the m-th smallest coordinate component as the third value and maintaining the m-th largest coordinate value as the fourth value; if the checking is negative, incrementing m and repeating the checking, until the third and fourth value can be maintained; forming the focus area as a rectangle the sides of which are defined by the first and second value with respect to the first axis and by the third and fourth values with respect to the second axis.

For instance, the first axis may represent a north-south direction, and the second axis may represent a west-east direction.

In contrast to the previous exemplary method for determining the focus area, it is thus possible to enlarge the focus area only with respect to the first axis or the second axis. If it is found that the first value is smaller than the second value, only these values are changed until the first value is larger than or equal to the second value. The same holds for the third and fourth value. It is of course possible that both the first and second value and the third and fourth value have to be changed to arrive at a non-empty focus area. However, the focus area obtained will in general be smaller than the focus area obtained by the previous exemplary method for determining the focus area, which may contribute to increasing the accuracy of the position of the terminal determined based on the focus area and/or to reducing the computational complexity of the determining of the position of the terminal (for instance if this position is determined by numerical integration in the focus area, and if always the same resolution is desired).

Correspondingly, in case of 3D areas, in case that the intersection of all areas of the set of areas is not found to be potentially non-empty, the focus area may exemplarily be determined based on a coordinate system, which defines a first axis, a second axis and a third axis being mutually orthogonal, and the determining of the focus area may exemplarily comprise:

if a first value representing the smallest coordinate component with respect to the first axis from a set containing, for each area in the set of areas, the largest coordinate component with respect to the first axis is larger than or equal to a second value representing the largest coordinate component with respect to the first axis from a set containing, for each area in the set of areas, the smallest coordinate component with respect to the first axis, maintaining the first value and the second value, and otherwise: choosing a variable n equal to 2; checking if the n-th smallest coordinate component with respect to the first axis from a set containing, for each area in the set of areas, the largest coordinate component with respect to the first axis is larger than or equal to the n-th largest coordinate component with respect to the first axis from a set containing, for each area in the set of areas, the smallest coordinate component with respect to the first axis; if the checking is positive, maintaining the n-th smallest coordinate component as the first value and maintaining the n-th largest coordinate value as the second value, if the checking is negative, incrementing n and repeating the checking, until the first and second value can be maintained;

if a third value representing the smallest coordinate component with respect to the second axis from a set containing, for each area in the set of areas, the largest coordinate component with respect to the second axis is larger than or equal to a fourth value representing the largest coordinate component with respect to the second axis from a set containing, for each area in the set of areas, the smallest coordinate component with respect to the second axis, maintaining the third value and the fourth value, and otherwise: choosing a variable m equal to 2; checking if the m-th smallest coordinate component with respect to the second axis from a set containing, for each area in the set of areas, the largest coordinate component with respect to the second axis is larger than or equal to the m-th largest coordinate component with respect to the second axis from a set containing, for each area in the set of areas, the smallest coordinate component with respect to the second axis; if the checking is positive, maintaining the m-th smallest coordinate component as the third value and maintaining the m-th largest coordinate value as the fourth value; if the checking is negative, incrementing m and repeating the checking, until the third and fourth value can be maintained;

if a fifth value representing the smallest coordinate component with respect to the third axis from a set containing, for each area in the set of areas, the largest coordinate component with respect to the third axis is larger than or equal to a sixth value representing the largest coordinate component with respect to the third axis from a set containing, for each area in the set of areas, the smallest coordinate component with respect to the third axis, maintaining the fifth value and the sixth value, and otherwise: choosing a variable o equal to 2; checking if the o-th smallest coordinate component with respect to the third axis from a set containing, for each area in the set of areas, the largest coordinate component with respect to the third axis is larger than or equal to the o-th largest coordinate component with respect to the third axis from a set containing, for each area in the set of areas, the smallest coordinate component with respect to the third axis; if the checking is positive, maintaining the o-th smallest coordinate component as the fifth value and maintaining the o-th largest coordinate value as the sixth value; if the checking is negative, incrementing o and repeating the checking, until the fifth and sixth value can be maintained; forming the focus area as a rectangular cuboid the sides of which are defined by the first and second value with respect to the first axis, by the third and fourth values with respect to the second axis and by the fifth and sixth values with respect to the third axis.

For instance, the first axis may represent a north-south direction, the second axis may represent a west-east direction, and the third axis may represent a height/altitude.

In the following, examples for the determining of the position of the terminal based on the focus area are presented.

As first example, the position of the terminal may be determined as the centre of the focus area. This may allow for a particularly low computational complexity.

As a second example, the determining of the position of the terminal may be based on a weighted sum of positions that are distributed within the focus area. Therein, a pre-defined number of positions may be distributed within the focus area, for instance randomly or pseudo-randomly. Equally well, the positions may be distributed within the focus area according to a regular grid. The distribution may for instance be based on a maximum discrepancy sequence, such as a Halton sequence. Each position may be multiplied by a respective weight, which weight may for instance depend on the distances of the position from all areas (for instance from their centres or borders) in the set of areas. For instance, each weight may be or may depend on a product of a plurality of sub-weights, wherein each sub-weight may for instance be a function of the distance from the position the weight is to be multiplied by to an area in the set of areas (for instance an elliptical distance as defined below in case of elliptical areas), for instance in a way that for each area in the set of areas, there exists a respective sub-weight that is a function of the distance from the position and the area. A weight assigned to a position may furthermore depend on one or more parameters measured by the terminal the position of which is to be determined, such as for instance a parameter related to a distance of the terminal the position of which is to be determined from a communication (for instance a timing parameter (e.g. a TA value) or a parameter related to attenuation of a signal sent by the communication node).

Therein, at least an initially used definition of weights to be multiplied by the positions in the weighted sum of positions may depend on the result of the checking whether the intersection of all areas of the set of areas is potentially non-empty. For instance, in case of a potentially non-empty intersection, a first definition may be initially used, and in case of a not potentially non-empty intersection, a second definition may be used. Nevertheless, if the initially used first definition would lead to all weights being zero, it may still be switched to the second definition even in case of a potentially non-empty intersection.

For instance, in case that the intersection of all areas of the set of areas is found to be potentially non-empty, a definition of the weights to be multiplied by positions in the weighted sum of positions may at least initially be used that causes only weights that are to be multiplied by positions that are inside all areas of the set of areas or inside all areas of a pre-defined sub-set of said set of areas to be non-zero. This may be considered as a kind of "hard" weighting, where only positions that are within all areas of the set of areas (or inside all areas of a pre-defined sub-set of said set of areas) provide—due to their non-zero weight factor—a contribution to the weighted sum of positions. If the weight is or depends on a product of sub-weights as described above, it may for instance be defined that the sub-weights are only non-zero if the distance from the position the weight is to be multiplied by to the respective area (to which the sub-weight pertains) indicates that the position is within the respective area.

Such a kind of weighting may be advantageous in case that an intersection of all areas in the set of areas exists, since then only positions lying in this intersection (or in an intersection of a subset of all areas) contribute to the position of the terminal to be determined.

Therein, if the set of areas comprises two different types of areas (areas of a first type and areas of a second type), the pre-defined subset of areas may for instance be defined to only contain areas of the first type. Examples of areas of the first type may for instance be coverage areas that are represented by coverage models, and examples of areas of the second type may for instance be areas that depend on a distance-related measurement of the terminal the position of which is to be determined with respect to a communication node, e.g. a maximum distance area that is based on a timing (e.g. TA) measurement. The areas of the second type may nevertheless be considered in the calculation of weights that are to be multiplied by the positions.

However, in case that all of the weights that are to be multiplied by the positions in the weighted sum of positions would be zero according to the at least initially used definition, an alternative definition of the weights to be multiplied by the positions in the weighted sum of positions may be used that also allows weights that are to multiplied by positions that are not inside all areas of the set of areas or not inside all areas of said pre-defined sub-set of said set of areas to be non-zero.

All of the weights being zero indicates that, although it was found that an intersection potentially exists, actually no intersection exists (or that the intersection is so small that none of the (sample) positions falls into it). To determine a position of the terminal, it may then be advantageous to switch to the alternative definition of weights that also allows weights that are to be multiplied by positions that are not inside all areas of the set of areas (or not inside all areas of a said pre-defined sub-set of said set of areas) to be non-zero. This may be considered as a kind of "soft" weighting. If the weight is or depends on a product of sub-weights as described above, it may for instance be defined that the sub-weights may be non-zero if the position (which is to be multiplied by the weight) is within the respective area (to which the sub-weight pertains), and may decrease with increasing distance of the position from the respective area (for instance from its centre or border). Thus the closer a position is located to all areas of the set of areas (or to all areas of said pre-defined sub-set of said set of areas), the larger its weight may be, and thus the larger its contribution in the weighted sum of positions may be.

The alternative definition of the weights may for instance be the same definition of the weights that is used in case that the intersection of all areas of the set of areas is not found to be potentially non-empty.

In case that the intersection of all areas of the set of areas is not found to be potentially non-empty, a definition of the weights that are to be multiplied by positions in the weighted sum of positions may be used that also allows weights that are to be multiplied by positions that are not inside all areas of the set of areas or not inside all areas of a pre-defined sub-set of said set of areas to be non-zero. Since an intersection of all areas of the set of areas does not exist in this case, it may be advantageous to use "soft" weighting. A weight to be multiplied by a position may then for instance represent a product of several sub-weights, wherein each sub-weight depends on a distance between the position and one of the areas in the set of areas. For instance, a sub-weight may then be non-zero if the position is within the respective area, and may decrease with increasing distance of the position from the respective area (for instance from its centre or border). Thus the closer a position is located to all areas of the set of areas (or to the pre-defined sub-set of the set of areas), the larger is its weight, and thus the larger its contribution in the weighted sum of positions.

In exemplary embodiments of the above-described determining of the terminal's position based on a weighted sum of positions, the weights to be multiplied by said positions in said weighted sum of positions depend on a distance-related measurement of said terminal the position of which is to be determined with respect to a communication node. Said distance-related measurement may for instance be a timing measurement (such as a TA measurement), or a signal attenuation/pathloss measurement.

It is to be noted that the above description of embodiments of the present invention is to be understood to be merely exemplary and non-limiting. Furthermore, the exemplary embodiments described above and in particular their single features shall be understood to be disclosed in all possible combinations with each other.

These and further concepts of the invention will be apparent from and elucidated with reference to the detailed description presented hereinafter.

DETAILED DESCRIPTION OF EXEMPLARY EMBODIMENTS OF THE INVENTION

Satellite positioning does not work well indoors or in other shadowed environments. However, various communication nodes are ubiquitous in the modern world. Non-limiting examples of such communication nodes include cellular base stations, WLAN Access Points (APs), FM radio or TV stations. These communication nodes have good penetration and coverage virtually everywhere of interest. Since the range of these communication nodes may usually be relatively short (for instance from hundreds of meters to some kilometers), these communication nodes may be exploited for positioning purposes. Furthermore, the density of such communication nodes (in particular WLAN APs) is generally high indoors and in urban canyons, where Global Navigation Satellite System (GNSS) based positioning methods have the largest problems. Positioning based on communication nodes may thus complement GNSS, inter alia to allow for more effective Location Based Services (LBS).

Figure 1:
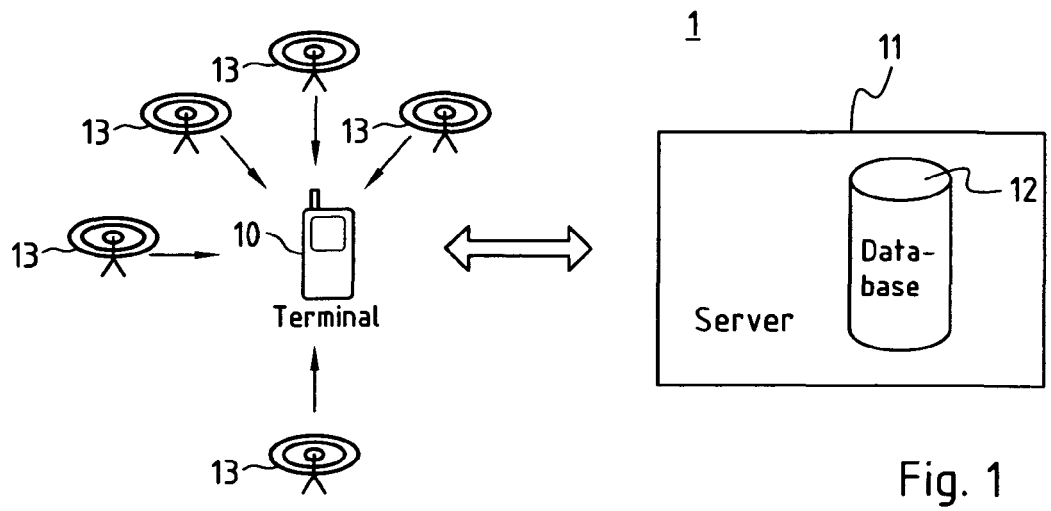
FIG. 1: A schematic illustration of the architecture of an exemplary system for determining a position of a terminal according to the present invention.

A schematic architecture of an example of such a positioning system 1 is shown in FIG. 1. The terminal 10 performs a scan to determine all communication nodes 13 that can presently be heard, and then compares the scan results to the records in a database 12. In the exemplary system of FIG. 1, database 12 is assumed to be located in a server 11. Terminal 10 then has to be capable of communicating with server 11 to retrieve information from database 11. It should be noted that the entire database, or at least parts thereof, may equally well be stored in a local memory of terminal 10. For instance, specific records (for instance records pertaining to a specific region and/or one or more specific communication systems) may be downloaded to the terminal 10 from database 12 of server 11 for storage and reference, for instance upon request of terminal 10 or automatically. Furthermore, it should be noted that the communication nodes 13 in the exemplary system of FIG. 1 may all pertain to one communication system (e.g. WLAN), but may equally well pertain to more than one communication system (e.g. WLAN and one or more cellular communication systems). Similarly, the communication between terminal 10 and server 11 may be based on a communication system that equals to or is different from the communication system(s) to which communication nodes 13 pertain.

Database 12 may for instance comprise, for each communication node 13, an identifier (such as a Medium Access Control (MAC) Identifier (ID)) and a position and/or a coverage model (i.e. a model for the coverage area) of the communication node 13.

As will be described in more detail below, terminal 10 may then combine the positions and/or coverage models of the heard communication nodes 13 and possibly further measured information such as information relating to the distance to one or more communication nodes 13 (e.g. Received Signal Strength (RSS) or Timing Advance (TA) measurements) in a suitable manner to derive its position. Even satellite (GNSS) pseudo-range measurements may be taken into account in this derivation. Equally well, the determining of the terminal's position may be performed in server 11, based on information on the communication nodes 13 the terminal 10 is presently able to hear (and possibly further information) as received from terminal 10.

The databases (like database 12 in FIG. 1) for this kind of positioning can be built in various ways. One solution may be that a company buys hotspot directories from network providers and assimilates these directories in their databases. Alternatively, a plurality of terminals may be deployed to gain information on the position and/or coverage models of the communication nodes. In such a case the terminals may have a Global Navigation Satellite System (GNSS) or Assisted GNSS (AGNSS) receiver attached to or inside the terminal and provide so-called fingerprints, which comprise a current position of the terminal and a list of the communication nodes that can presently be heard, to a server. The fingerprint may also comprise signal characteristics data for the communication nodes measured. Such characteristics data may include signal strength measurements, time delay measurements, time difference measurements between nodes, RAKE fingerprints, power histograms or even measurements from multiple antennas (diversity receiver), to name but a few non-limiting examples. The server may then derive, for each communication node, a coverage model based on the positions of the terminals that were able to hear the communication node, and may further estimate the position of the communication node from this data. Alternatively, it may also be the case that the database build-up is a community-based effort.

It is readily understood by a person skilled in the art that the positioning techniques described above are applicable with any radio network-technology as well. Potential candidates include Bluetooth, Wibree (Ultra Low Power Bluetooth), Global System for Mobile Communication (GSM), Wideband Code Division Multiple Access (WCDMA), Code Division Multiple Access (CDMA), Long Term Evolution (LTE), Worldwide Interoperability for Microwave Access (WiMAX), to name but a few non-limiting examples. Therein, WLAN-based positioning may well be combined/complemented with positioning that is based on IDs of cells of one or more cellular communication systems. When collecting the data for a WLAN AP database, then also information on 2G (second generation, e.g. Global System for Mobile Communications, GSM) and/or 3G (third generation, e.g. Universal Mobile Telecommunication System, UMTS) cells (or on cells of any cellular communication system) that can be observed in the present position (serving cell and optionally also the neighboring stations) may be collected and thus is available to terminals for positioning.

Figure 2A:
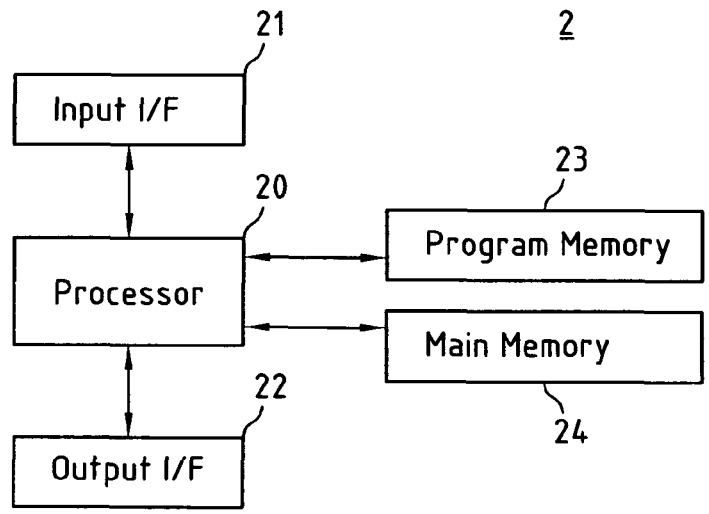
FIG. 2a: a schematic block diagram of an exemplary embodiment of an apparatus according to the present invention.

FIG. 2a is a schematic block diagram of an exemplary embodiment of an apparatus 2 according to the present invention. This apparatus may be embodied as terminal 10 or server 11 in FIG. 1 or as a part (e.g. a functional unit) thereof. Apparatus 2 may for instance be entirely implemented as a module that may for instance be integrated into terminal 10 or server 11. Apparatus 2 may for instance be entirely implemented as a circuit on a semiconductor chip. Apparatus 2 may for instance be entirely implemented on a Digital Signal Processor (DSP), Application Specific Integrated Circuit (ASIC) or Field Programmable Gate Array (FPGA), to name but a few examples.

Apparatus 2 comprises a processor 20 that interacts with an input interface 21, and output interface 22, program memory 23 and main memory 24. Processor 20 is at least configured to check if an intersection of all areas of a set of areas that are associated with one or more communication nodes and represent possible positions of a terminal is potentially non-empty, and to determine a position of said terminal in dependence on a result of the checking if said intersection of all areas of said set of areas is potentially non-empty. Processor 20 may for instance run a computer program with program code for checking if an intersection of all areas of a set of areas that are associated with one or more communication nodes and represent possible positions of a terminal is potentially non-empty, and with program code for determining a position of said terminal in dependence on a result of the checking if said intersection of all areas of said set of areas is potentially non-empty. This program code may for instance be stored in program memory 23, which may be fixedly attached in apparatus 2 or may be a removable memory. Main memory 24 is used by processor 20 as a working memory, for instance to store intermediate results and variables. It may also partially or entirely store a database containing information on positions and/or coverage models of a plurality of communication nodes (like database 12 in the exemplary system of FIG. 1). Instead of main memory 24, also a dedicated further memory unit may be foreseen in apparatus 2 for storage of such data.

Input interface 21 is configured to receive information that is needed by processor 20 for the checking if a non-empty intersection of all areas in the set of areas exists, and for the determining of the terminal's position. This information may for instance comprise information on the set of areas, for instance coverage models and/or positions of the communication nodes, but equally well further information such as quality indicators for the coverage models and/or positions of the communication nodes. Such information may for instance be received from database 12 (see FIG. 1), if it is not stored in apparatus 2 (e.g. in main memory 24). Furthermore, this information may comprise measurement data generated by terminal 10, such as for instance timing (e.g. TA) measurements or other types of measurements that allow at least roughly determining a distance between terminal 10 and one or more communication nodes 13.

Output interface 22 is configured to output information generated by processor 20, for instance the determined position of the terminal (and optionally further parameters, such as for instance an error measure or quality indicator for this position). If apparatus 2 is a part of terminal 10 in FIG. 1, the determined position of the terminal may for instance be provided to another functional unit in apparatus 2 to be used in positioning and/or navigation applications. If apparatus 2 is apart of server 11 of FIG. 1, the determined position of the terminal may for instance be provided to terminal 10 to be used in positioning and/or navigation applications, or to another unit (for instance if a third party has requested localization of terminal 10).

Figure 2B:
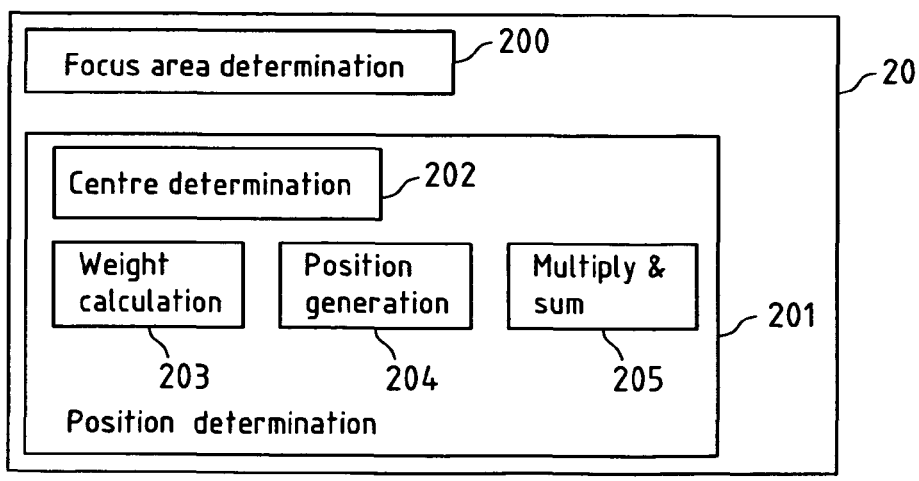
FIG. 2b: a schematic block diagram of exemplary components of an apparatus according to the present invention.

FIG. 2b is a schematic illustration of exemplary components of processor 20 of apparatus 2 (see FIG. 2a). Processor 20 comprises a focus area determination block 200 and a position determination block 201. Position determination block 201 has the following components: a centre determination block 202, a weight calculation block 203, a position generation block 204 and a multiply & sum block 205. These blocks will be described in more detail with respect to FIGS. 5 and 6 below.

Figure 3:
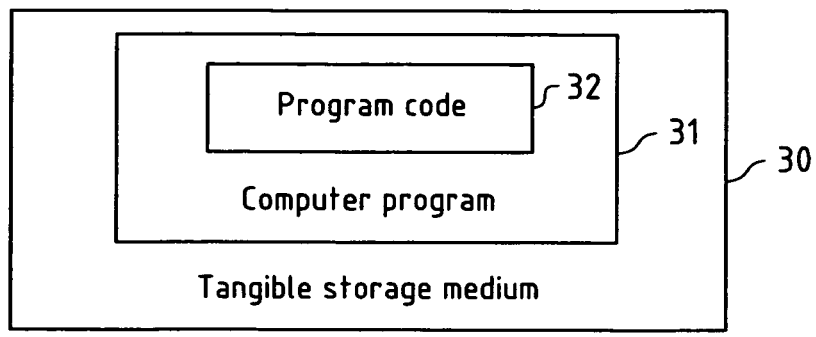
FIG. 3: a schematic illustration of an exemplary embodiment of a tangible storage medium according to the present invention.

FIG. 3 is schematic illustration of an exemplary embodiment of a tangible storage medium 30 according to the present invention. Tangible storage medium 30 may for instance store a computer program 31 with program code 32 for checking if an intersection of all areas of a set of areas that are associated with one or more communication nodes and represent possible positions of a terminal is potentially non-empty, and with program code 32 for determining a position of said terminal in dependence on a result of the checking if said intersection of all areas of said set of areas is potentially non-empty. Tangible storage medium 30 is a readable medium, for instance a computer-readable or processor-readable medium. Accordingly, the computer program 31 stored on tangible storage medium 30 may be executable by a computer or a processor. Tangible storage medium 30 may for instance be embodied as an electric, magnetic, electro-magnetic, optic or other tangible storage medium, and may either be a removable medium or a medium that is fixedly installed in an apparatus or device, such as for instance apparatus 2 of FIG. 2a.

Figure 4:
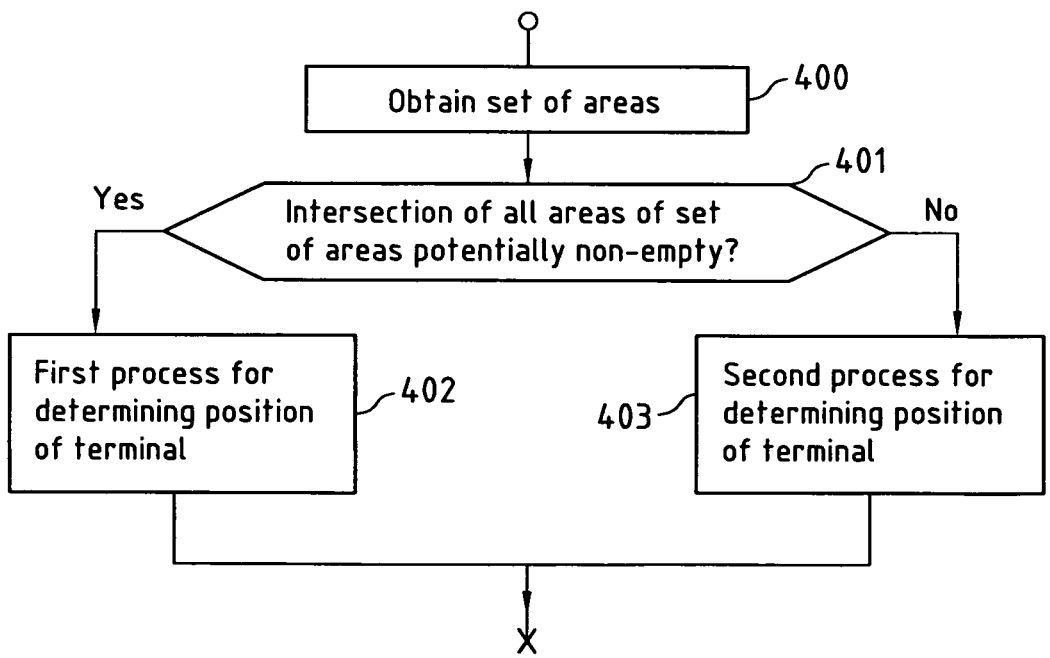
FIG. 4: a flowchart of an exemplary embodiment of a method according to the present invention.
Figure 5:
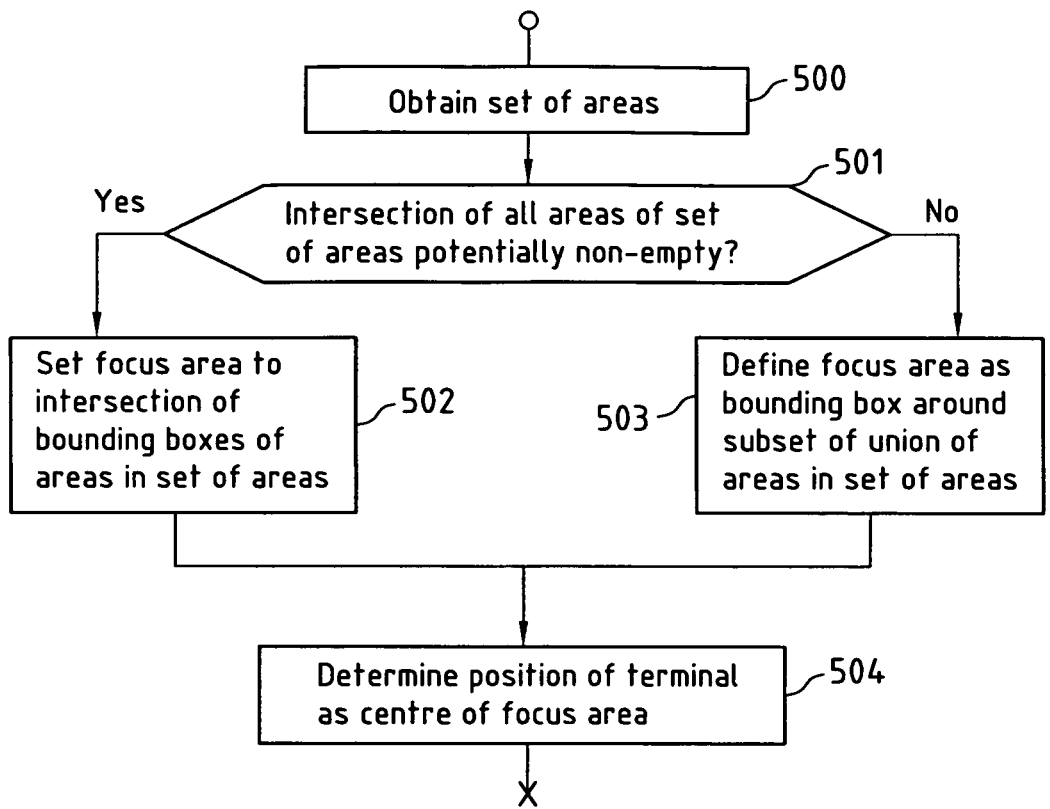
FIG. 5: a flowchart of a further exemplary embodiment of a method according to the present invention.
Figure 6:
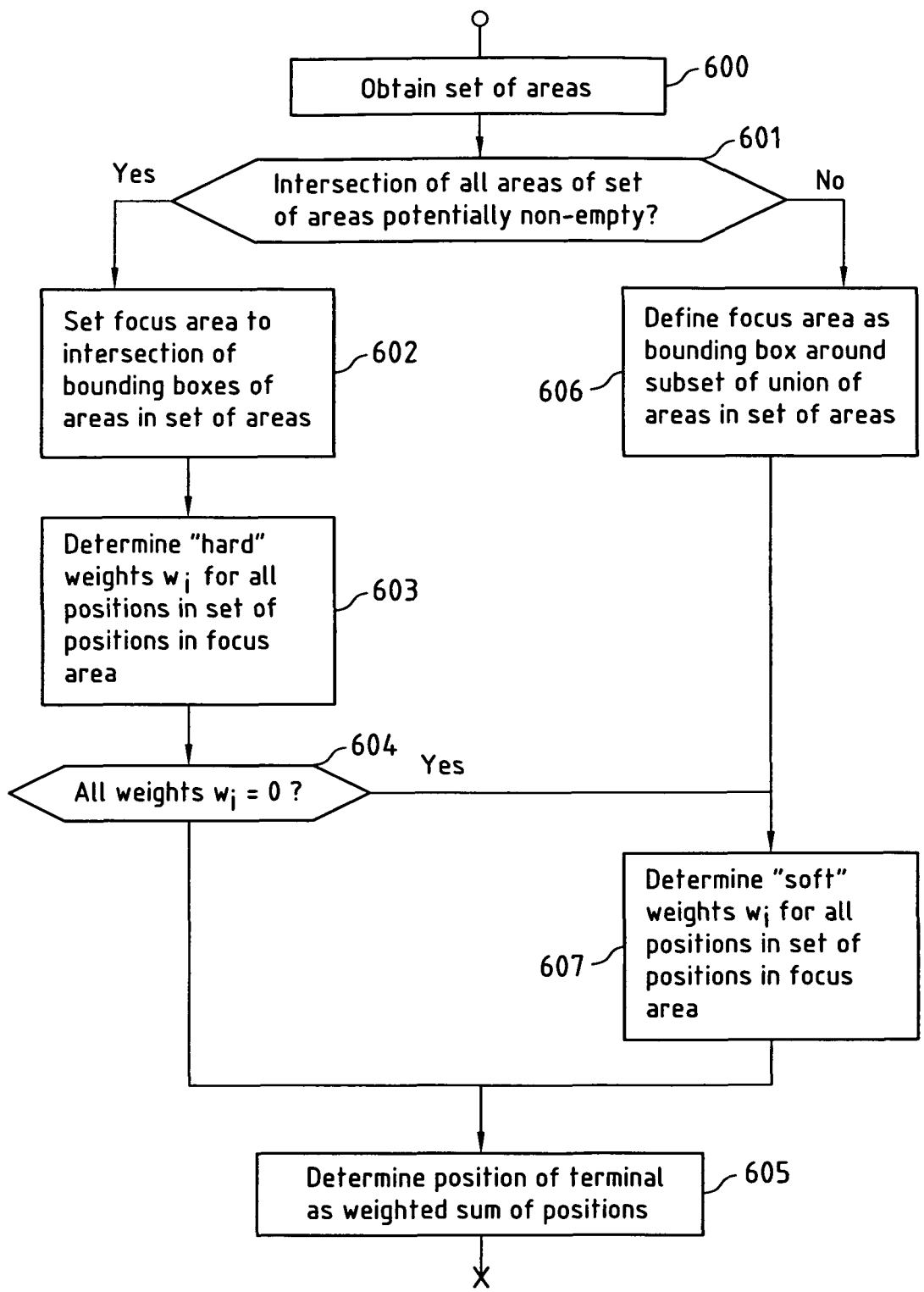
FIG. 6: a flowchart of a further exemplary embodiment of a method according to the present invention.

FIGS. 4-6 are flowcharts of exemplary embodiments of methods according to the present invention. These flowcharts may for instance be implemented as computer programs that are stored in program memory 23 of apparatus 2 (see FIG. 2a). Consequently, these flowcharts may be executed by processor 20 of apparatus 2. Equally well, these flowcharts may be implemented as program code 32 of computer program 31 stored on tangible storage medium 30 (see FIG. 3).

In the flowchart of FIG. 4, in a first step 400, a set of areas is obtained (for instance via input interface 21 of apparatus 2, see FIG. 2a). This set of areas contains areas that are associated with communication nodes 13 (see FIG. 1) and represent possible positions of terminal 10.

In the following, it is exemplarily assumed that this set of areas may comprise two different types of areas.

A first type of area represents or is related to a coverage area of a communication node 13, which coverage area is represented by a coverage model. Such a coverage model may be determined analytically or based on measurements received from a plurality of terminals, as already described above. Exemplary non-limiting types of coverage models are elliptical or polygonal coverage models. In the following, these coverage models will exemplarily be assumed to be elliptical.

Furthermore, these elliptical coverage models will exemplarily be assumed to be in matrix-form, which is determined by the following parameters: coordinates of the centre $c=(lat_E, lon_E)$ as World Geodetic System WGS-84 longitude and latitude, and three coefficients $a>0$, $d>0$, and b so that point $x=(lat, lon)$ is inside the ellipse if $$(x-c)^T A(x-c) \leq 1$$

with $$A = \begin{bmatrix} a & b \\ b & d \end{bmatrix}.$$

This ellipse may be interpreted as a "hard" boundary for the positions in the coverage area, i.e. that the ellipse corresponds to the boundary of the coverage area. Equally well, the ellipse may be interpreted to represent a "soft" (statistical) boundary for the coverage area. For instance, the centre c may then be interpreted as the mean value and the matrix A may then be interpreted as the covariance matrix, for instance of a 2D Gaussian distribution assumed for the distribution of the positions in the coverage area. The ellipse may then no longer coincide with the outer boundary of the coverage area, it may rather define a sub-area of the coverage area, for instance the σ area, in which 39% of the positions are considered to be within, respectively. In the following, for the sake of simplicity of presentation, the coverage models are however considered to represent "hard" boundaries, although the present invention is not limited to those.

A second type of area is an area that is based on a measurement of terminal 10 (see FIG. 1) with respect to this terminal's distance to one of the communication nodes 13. Such a measurement may for instance be a Received Signal Strength (RSS) measurement (if the transmission power of the sender is known) and a timing measurement. For instance, in GSM systems, a Timing Advance (TA) parameter is determined by the terminal. It gives an indication of the travel time of a signal from a terminal to a communication node with a resolution of 550 m and is used to accomplish synchronization between the terminals' transmissions.

Figure 7:
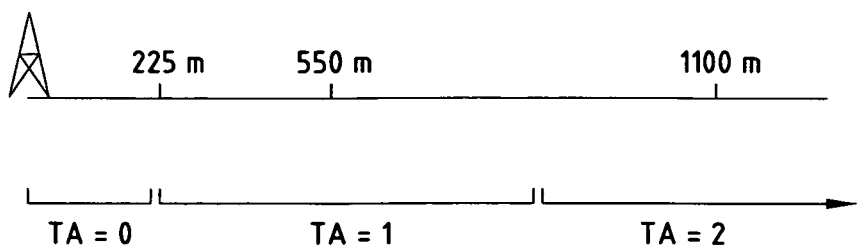
FIG. 7: a schematic illustration of a relationship between a timing advance parameter and the distance towards a communication node.

FIG. 7 illustrates the relationship between the TA parameter and the distance to a communication node, which is depicted at the left of FIG. 7. The TA measurement is defined as an integer number from 0 to 63 such that $$TA = round(dist(x, x_{CN}), 550 \text{ m}),$$

where dist denotes the Euclidean distance between the communication node (with position $x_{CN}$) and the terminal with position x.

Figure 8:
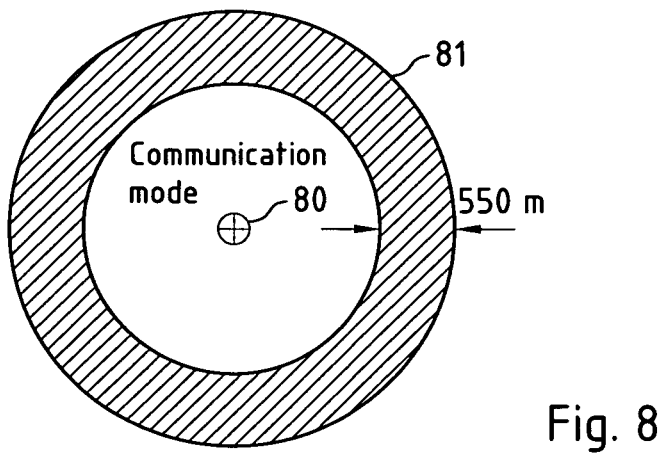
FIG. 8: a schematic illustration of a ring-shaped area corresponding to a timing advance measurement.

FIG. 8 schematically illustrates the ring-shaped area 81 of width 550 m (shown in hatched form) in which a terminal may be positioned with respect to communication node 80 if a specific TA parameter has been measured. The probability distribution of the terminal within the hatched area 81 is uniform.

In exemplary embodiments of the present invention, the TA measurement is used to obtain a maximum distance measurement by noting that the distance from communication node 80 to a terminal in the hatched area 81 corresponding to the TA measurement cannot be larger than the outer edge of the hatched area 81.

This circle can be written in elliptical form as $$[x_1 - c_1 \quad x_2 - c_2] \frac{1}{\left(550\left(TA + \frac{1}{2}\right)\right)^2} \begin{bmatrix} s_N^{-2} & 0 \\ 0 & s_N^{-2} \end{bmatrix} \begin{bmatrix} x_1 - c_1 \\ x_2 - c_2 \end{bmatrix} \leq 1,$$

where $[c_1 \ c_2]^T$ are the latitude and longitude coordinates of the communication node, and $s_E$ and $s_N$ are the scaling coefficients for East and North directions, as described below.

At latitude $\phi$, the length of one meter in East/North directions in degrees is:

$$s_E(\phi) = \frac{180}{\pi} \frac{\sqrt{1 - e^2 \sin(\phi)^2}}{a \cos(\phi)} \text{ degrees/meter}$$

$$s_N(\phi) = \frac{180}{\pi} \frac{(1 - e^2 \sin(\phi)^2)^{\frac{3}{2}}}{a(1 - e^2)} \text{ degrees/meter},$$

where a and e are the WGS-84 semi-major axis and eccentricity of Earth.

Returning to FIG. 4, the set of areas obtained in step 400 thus may for instance comprise the coverage areas for those communication nodes 13 (see FIG. 1) that terminal 10 can presently hear, and a maximum distance (TA-based) area.

If the method of FIG. 4 is performed by the terminal 10 of FIG. 1, the coverage models for these coverage areas may be received from database 12 of server 11, or be retrieved from a memory in the terminal. Also the position of the communication node to which the terminal's TA measurement is related may then be retrieved from database 12 of server 11, or even already the entire maximum distance elliptical model, if it is computed by server 11 (based on the TA parameter and an identification of the communication node received from terminal 10).

If the method of FIG. 4 is performed by server 11 of FIG. 1, the coverage models and the maximum distance elliptical model may be obtained by the component of server 11 that implements the method of FIG. 4 from a functional unit of server 11 that retrieves the coverage models (based on the received IDs of the communication nodes) from database 12 and generates the maximum distance elliptical model (based on the received TA parameter and received ID of the communication node).

In a second step 401 of FIG. 4, it is then decided (for instance by processor 20 of FIG. 2*a*), if an intersection of all areas of the set of areas obtained in step 400 is potentially not-empty.

Therein, an intersection of all areas of the set of areas is defined to be potentially non-empty if an intersection of respective bounding boxes associable to each area in the set of areas is non-empty. A potentially non-empty intersection means that, if an intersection of all areas exists, it is within the intersection of the bounding boxes. On the other hand, if an intersection of the bounding boxes does not exist, this means that there also exists no intersection of all areas.

Figure 9A:
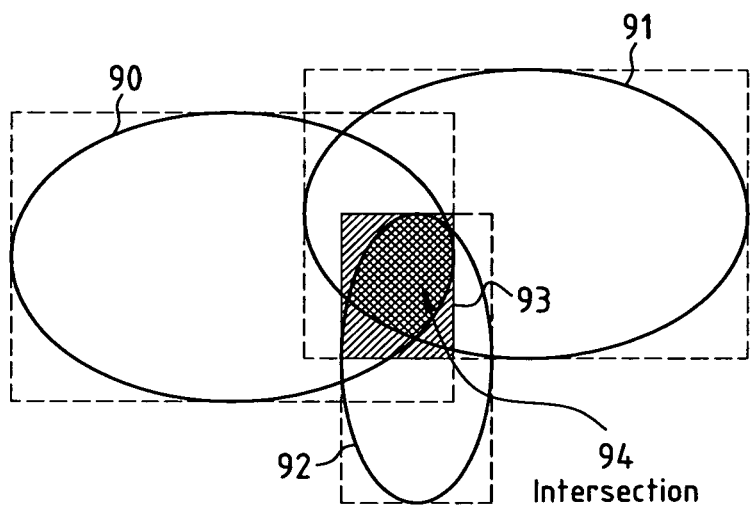
FIG. 9a: a schematic illustration of three areas that have a non-empty intersection, and the corresponding bounding boxes.
Figure 9B:
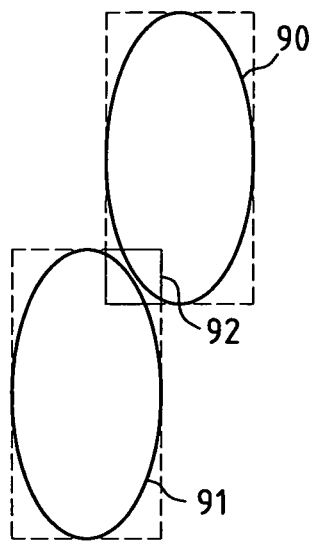
FIG. 9b: a schematic illustration of three areas that only have a potentially non-empty intersection, and the corresponding bounding boxes.
Figure 9C:
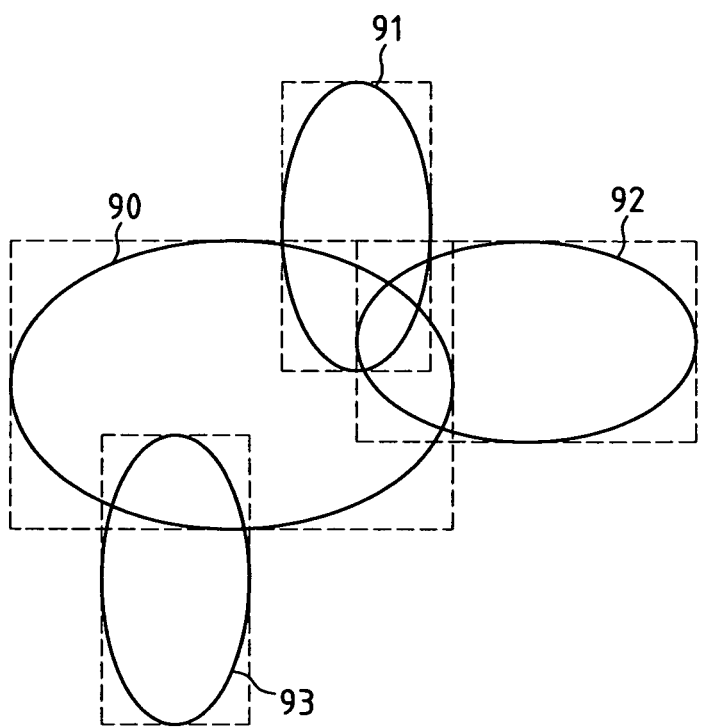
FIG. 9c: a schematic illustration of three areas that have an empty intersection, and the corresponding bounding boxes.

This is illustrated by FIGS. 9*a*-9*c*. Note that, although exemplarily only elliptical areas with respectively different semi-major and semi-minor axes are shown, equally well also one or more areas of circular shape, such as for instance the maximum distance (e.g. TA-based) circles, may be present in the scenarios of FIGS. 9*a*-9*c* and could be analyzed for a joint intersection as discussed below.

In FIG. 9*a*, there are three elliptical areas 90, 91 and 92. To each of these elliptical areas, a bounding box (in dashed lines) has been associated. Each bounding box has two sides parallel to a north/south axis, and two sides parallel to a west-east axis (which axis are however not shown in FIGS. 9*a*-9*c*). Under this constraint, the bounding boxes are the minimum rectangles than can be fitted around ellipses 90, 91 and 92.

It is readily seen that the bounding boxes of ellipses 90, 91 and 92 have a non-empty intersection 93 (given in solid lines and shown hatched). Thus an intersection of ellipses 90, 91 and 92 is potentially non-empty. As can be seen from FIG. 9*a*, an intersection 94 of ellipses 90, 91 and 92 indeed is non-empty (shown cross-hatched), and lies within the intersection 93 of all bounding boxes.

However, a potentially non-empty intersection of all ellipses only means that, if an intersection of all areas exists, it is within the intersection of the bounding boxes, but it does not mean that an intersection of all areas actually exists. This is shown in FIG. 9*b*. An intersection 92 of the bounding boxes of ellipses 90 and 91 is non-empty (i.e. an intersection potentially is non-empty), but in fact, no intersection of ellipses 90 and 91 exists.

Finally, FIG. 9*c* illustrates a scenario where an intersection of the bounding boxes of ellipses 90-93 is empty, so that the intersection of ellipses 90-93 is not potentially non-empty or, in other words, empty.

The checking if an intersection is potentially non-empty according to step 401 of the flowchart of FIG. 4 may be performed in a plurality of ways. A straightforward way may for instance be to actually determine the bounding boxes for the areas (ellipses) in FIGS. 9*a*-9*c* and to determine if their intersection is non-empty (i.e. exists).

Figure 10:
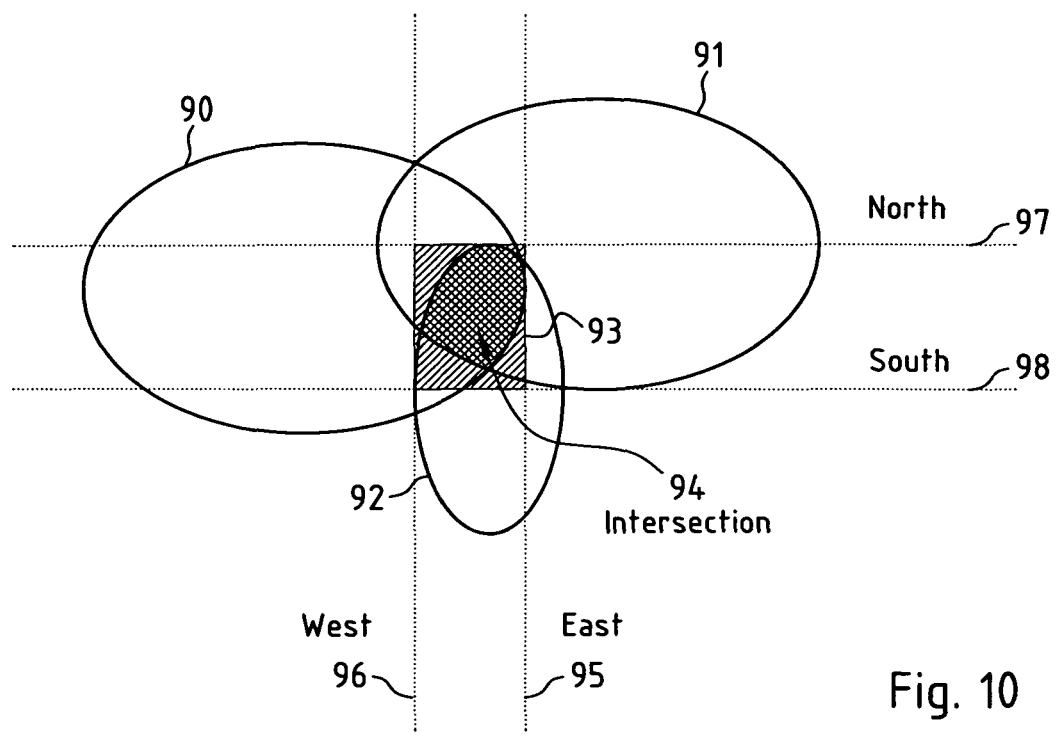
FIG. 10: a schematic illustration of an exemplary method for determining if an intersection of all areas is potentially non-empty according to the present invention.

A more efficient approach may however be to proceed as follows (as illustrated in FIG. 10, which shows the same scenario as FIG. 9*a*):

Take the north-most point of each area (ellipses 90-92 in FIG. 10) and select the south-most of these to define a north boundary 97;

Take the south-most point of each area (ellipses 90-92 in FIG. 10) and select the north-most of these to define a south boundary 98;

Take the west-most point of each area (ellipses 90-92 in FIG. 10) and select the east-most of these to define a west boundary 96;

Take the east-most point of each area (ellipses 90-92 in FIG. 10) and select the west-most of these to define an east boundary 95;

If the north boundary 97 is north of (or on top of) the south boundary 98 and if the west boundary 96 is west of (or on top of) the east boundary 95, these four boundaries define the intersection 93 of the bounding boxes of all areas. This intersection 93 in FIG. 10 equals intersection 93 in FIG. 9a and thus indicates that an intersection of all areas (ellipses 90-92) potentially exists.

The above-described approach for checking if an intersection of all areas of a set of areas is potentially non-empty is not limited to elliptical areas. However, in case of elliptical areas, with each elliptical area being of the (already introduced) form $$[x_1 - c_{1,i} \quad x_2 - c_{2,i}] \begin{bmatrix} a_i & b_i \\ b_i & d_i \end{bmatrix} \begin{bmatrix} x_1 - c_{1,i} \\ x_2 - c_{2,i} \end{bmatrix} \leq 1,$$

its maximum and minimum coordinates in north-south ($x_1$) and east-west ($x_2$) directions can be directly given as $$\max(x_{1,i}) \in c_{1,i} + \sqrt{\frac{d_i}{a_i d_i - b_i^2}}, \min(x_{1,i}) \in c_{1,i} - \sqrt{\frac{d_i}{a_i d_i - b_i^2}},$$

$$\max(x_{2,i}) \in c_{2,i} + \sqrt{\frac{a_i}{a_i d_i - b_i^2}}, \min(x_{2,i}) \in c_{2,i} - \sqrt{\frac{a_i}{a_i d_i - b_i^2}}$$

The intersection of the bounding boxes of these ellipses is thus also directly given as:

$$x_1^{bounding} = \left[\max_i\left(c_{1,i} - \sqrt{\frac{d_i}{a_i d_i - b_i^2}}\right), \min_i\left(c_{2,i} + \sqrt{\frac{d_i}{a_i d_i - b_i^2}}\right)\right]$$

$$x_2^{bounding} = \left[\max_i\left(c_{1,i} - \sqrt{\frac{a_i}{a_i d_i - b_i^2}}\right), \min_i\left(c_{2,i} + \sqrt{\frac{a_i}{a_i d_i - b_i^2}}\right)\right],$$

which is particularly easy to compute.

Returning to FIG. 4, in dependence on the result of the checking in step 401 if an intersection of all areas is potentially non-empty, either a first process for determining a position of a terminal is performed in step 402, or a second process for determining a position of a terminal is performed in step 403. Subsequently, the method terminates.

The exemplary method according to the present invention described with reference to FIG. 4 above addresses situations where one or more area in the set of areas are incorrect, for instance too small or in the wrong place.

For instance, there may often be a coverage model in database 11 of the system of FIG. 1 that is incorrect or incomplete, in particular if the coverage model is generated based on fingerprints received from a plurality of terminals, but isn't mature yet since not enough fingerprints have been received yet. Such problems may also persist with mature coverage models because, when cellular network re-planning or moving of communication nodes (e.g. WLAN access points) occurs, also the coverage models have to be adapted accordingly.

Similarly, areas based on TA measurements also require the location of the respective communication node to be known. This location may be erroneous, and also the TA measurement itself may be distorted, for instance by multipath propagation. This results in areas based on TA measurements also being potentially incorrect.

Trying to determine a terminal's position from a set of areas that contains one or more incorrect areas may thus often lead to a situation where not all areas intersect (i.e. have a non-empty intersection). By exemplary embodiments of the present invention, an efficient handling of such situations is provided by first checking if an intersection of all areas potentially exists, and then adapting the determining of the terminal's position according to the result of this checking.

FIG. 5 depicts a further flowchart of an exemplary embodiment of a method according to the present invention. Therein, steps 500-501 correspond to steps 400-401 of the flowchart of FIG. 4.

If it is decided in step 501 that an intersection of all areas in the set of areas potentially exists, a focus area (based in which the terminal's position will be determined later) is defined as the intersection of the bounding boxes associable with the areas in the set of areas (see for instance intersection 93 in FIGS. 9a and 10) in step 502. The intersection of the bounding boxes may for instance already be available from the checking in step 501. For instance, if the checking in step 501 is based on fixing the north, south, west and east boundaries (see reference numerals 95-98 in FIG. 10), these boundaries already define the intersection of the bounding boxes, and thus the focus area.

If it is decided in step 501 that an intersection of all areas in the set of areas does not potentially exist, this means that actually no intersection of all areas in the set of areas exists, i.e. at least one of the areas in the set of areas is incorrect. Then, a different focus area as compared to step 502 has to be defined in step 503. In general terms, the focus area is then defined in step 503 as a bounding box around a subset of the union of areas in the set of areas, wherein this subset may, in the extreme case also equal the union of areas in the set of areas.

In the following, different exemplary approaches to define the focus area for the case that an intersection of all areas in the set of areas does not (potentially) exist will be presented.

According to a first exemplary approach, one or more areas are excluded from the set of areas to obtain a reduced set of areas. For the reduced set of areas, the steps 401-403 of the flowchart of FIG. 4 can be performed, i.e. it is checked if an intersection of all areas in the reduced set of areas is non-empty, and the determining of the terminal's position is then performed in dependence on the result of this checking.

Therein, if the set of areas contains a maximum distance (e.g. TA-based) area, by default this maximum distance area may be excluded from the set of areas first, since its accuracy depends on the position of the respective communication node, which position, depending on the way it is determined (for instance from fingerprints), may be subject to large errors.

Alternatively, if an error estimate (or another quality indicator) is available for one or more of the areas in the set of areas, the area with the worst error estimate (lowest quality) may be excluded, or all areas with error estimate above a pre-defined threshold may be excluded.

Further alternatively, it may be attempted to identify the area (or also more than one area) in the set of areas that causes the intersection of all areas to be not potentially non-empty, and to exclude this area. For instance, assume that there are m areas in the set of areas that do not have a potentially non-empty intersection. In such a case, generate all permutations of reduced sets of areas containing (m−1) areas and see if any of these reduced sets has a potentially non-empty intersection. If there is only one set with such a non-empty intersection, this reduced set may be used for further determining of the terminal's position. If there are still no sets with potentially non-empty intersections, all permutations of reduced sets of areas containing (m−2) areas could be determined and checked for a potentially non-empty intersection, and if there is a single reduced set with such a potentially non-empty intersection, this reduced set could be used for further determining of the terminal's position, and so on. Therein, a reduction of the set of areas below ceiling(m/2) areas may not be preferred, because otherwise more than half of the areas would be ignored (majority voting). As an example with m=5, the set of areas may for instance contain areas {A,B,C,D,E}, and if their intersection is not potentially non-empty, the five reduced sets with m=4 areas each ({B,C,D,E}, {A,C,D,E}, {A,B,D,E}}, {A,B,C,E} and {A,B,C,D}) should be checked. If one of these reduced sets yields a potentially non-empty intersection, it is used to determine the terminal's position. Otherwise, a further reduction to m=3 areas per reduced set takes place, but not below 3, since ceiling(5/2)=3.

According to a second exemplary approach to define the focus area for the case that an intersection of all areas in the set of areas does not (potentially) exist, no area is excluded from the set of areas. Instead, it is attempted to relax the above-described algorithm for finding a non-empty intersection of the bounding boxes of the areas in the set of areas in a way that the most extreme boundaries are removed.

This is accomplished by performing the following steps, (starting with n=2, since for n=1, the above-described algorithm for checking if an intersection of the bounding boxes of all areas in the set of areas is obtained):

Take the north-most point of each area and select the n-th south-most of these to define a north boundary;

Take the south-most point of each area and select the n-th north-most of these to define a south boundary;

Take the west-most point of each area and select the n-th east-most of these to define a west boundary;

Take the east-most point of each area and select the n-th west-most of these to define an east boundary;

If the north boundary is north of (or on top of) the south boundary, and if the west boundary is west of (or on top of) the east boundary, the rectangle bounded by the north, south, west and east boundary is considered as the focus area for further processing. Otherwise, the above steps are repeated after incrementing n by 1. This will eventually result in a useable focus area, because when n equals the number of areas in the set of areas, the resulting focus area is simply the bounding box around the union of the areas in the set of areas.

Figure 11A:
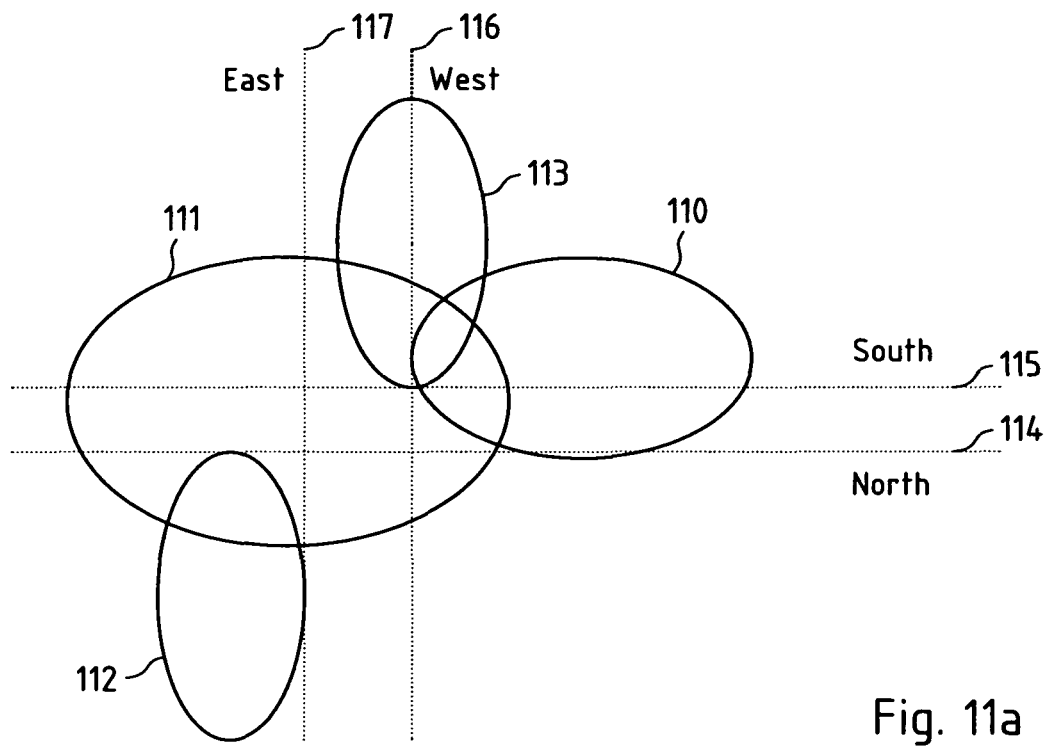
FIG. 11a: a schematic illustration of an exemplary approach for determining a focus area in case that no intersection of all areas exists.
Figure 11B:
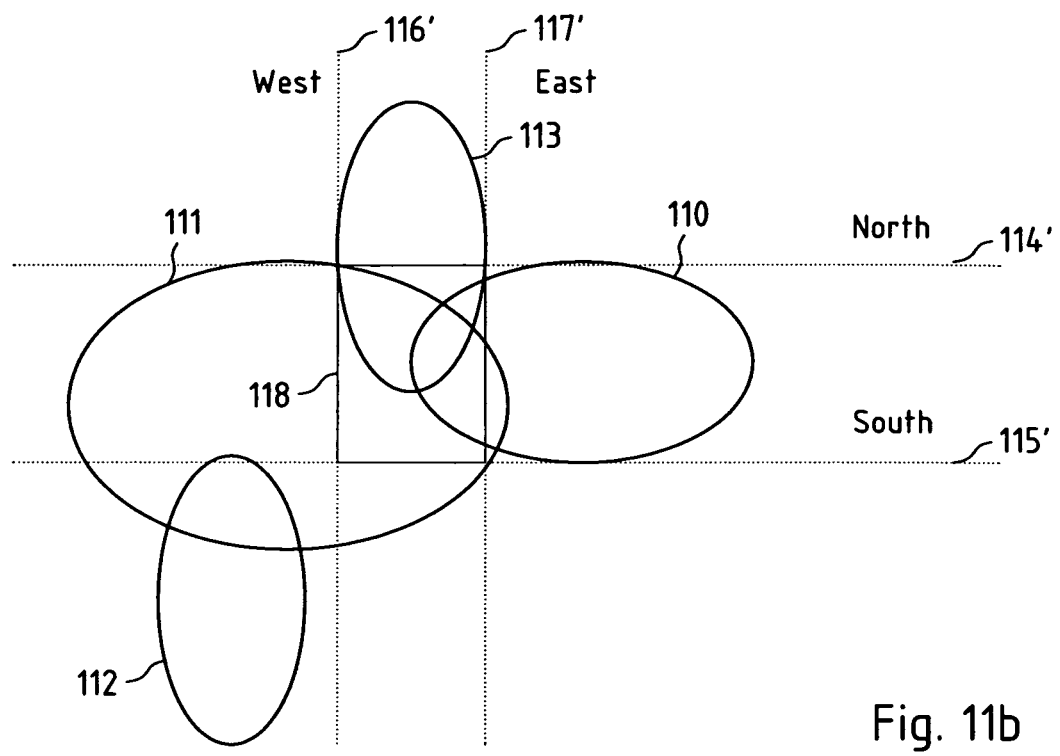
FIG. 11b: a schematic illustration of an exemplary approach for determining a focus area in case that no intersection of all areas exists.

This is exemplarily depicted with reference to FIGS. 11a and 11b. In FIG. 11a, there are four elliptical areas 110-113 that do not intersect. Accordingly, applying the above described algorithm for checking if an intersection of all areas is potentially non-empty produces the north boundary 114, the south boundary 115, the west boundary 116 and the east boundary 117, wherein, however, both the west and east boundaries and the north and south boundaries are flipped, so that it is determined that an intersection of all areas is not (potentially) non-empty.

FIG. 11b shows the result when the second exemplary approach for defining a focus area in case that an intersection of all areas is not (potentially) non-empty is applied with n=2. This yields north boundary 114', south boundary 115', west boundary 116' and east boundary 117'. Since north boundary 114' is north of south boundary 115', and since west boundary 116' is west of east boundary 117', a valid focus area 118 has been found. Note that the focus area 118 is larger than it would be if only areas 110, 111 and 113 were considered, but this second exemplary approach provides a fast way to produce a non-empty focus area. Knowing that excluding area 112 would result in a non-empty intersection could only be found by exhaustive search, which can be rather time-consuming. Also, it is also possible that the area 112 is actually correct (and areas 110, 111 and 113 have problems), so excluding area 112 may not be preferred.

A third exemplary approach to define the focus area for the case that an intersection of all areas in the set of areas does not (potentially) exist is similar to the second exemplary approach, but only operates on flipped north-south or west-east boundaries.

Figure 12A:
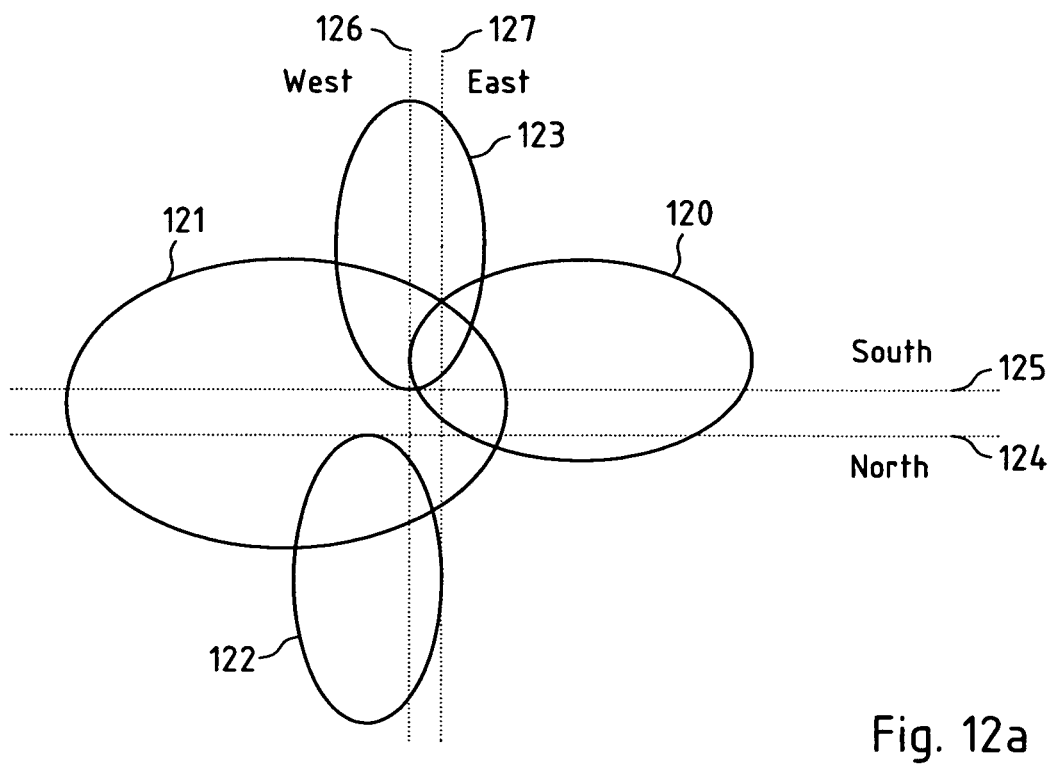
FIG. 12a: a schematic illustration of an exemplary approach for determining a focus area in case that no intersection of all areas exists.
Figure 12B:
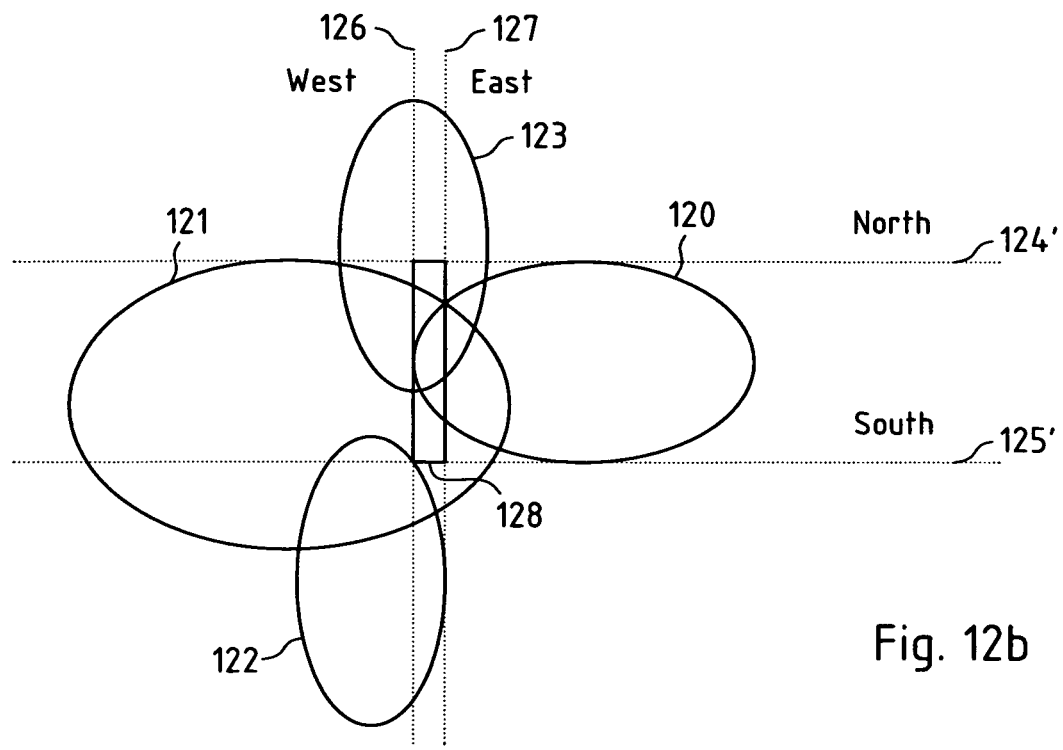
FIG. 12b: a schematic illustration of an exemplary approach for determining a focus area in case that no intersection of all areas exists.

This is illustrated with respect to FIGS. 12a and 12b. In FIG. 12a, there are four elliptical areas 120-123 that do not intersect. Accordingly, applying the above described algorithm for checking if an intersection of all areas is potentially non-empty produces the north boundary 124, the south boundary 125, the west boundary 126 and the east boundary 127, wherein, however, the north and south boundaries are flipped, so that it is determined that an intersection of all areas is not (potentially) non-empty.

In FIG. 12b, only the north boundary 124' and the south boundary 125' have been modified, by defining the north boundary and the south boundary as follows:

Take the north-most point of each area and select the second south-most of these to define a north boundary 124';

Take the south-most point of each area and select the second north-most of these to define a south boundary 125'.

Since the modified north boundary 124' is now north of the modified south boundary 125', these two boundaries, together with (non-modified) west boundary 126 and east boundary 127 are considered to define a valid focus area 128. Focus area 128 contains the intersection of areas 120, 121 and 123. Compared to the second approach, according to the third approach, only the height of the focus area is increased, whereas the width remains unaffected.

In contrast to the situation depicted in FIG. 12b, if selecting the n-th (with n=2) south-most point of the north-most points of each area to define the north boundary 124' and selecting the n-th (with n=2) north-most point of the south-most points of each area to define the south boundary 125' would still result in flipped north and south boundaries, n could be incremented by 1, until non-flipped boundaries would be obtained. Similarly, if only the west boundary and the east boundary would be flipped, an analog processing could be applied to modify these boundaries until they would be no longer flipped.

In summary, according to the third exemplary approach, when setting out from the algorithm for checking if an intersection of all areas in a set of areas is potentially non-empty, it may thus be advisable to consider whether moving boundaries only in one dimension (e.g. west-east or north-south) yields a valid focus area (i.e. one that does not have flipped boundaries).

Returning to FIG. 5, irrespective of how the focus areas has been determined (either in step 502 or in step 503), the position of the terminal is determined in step 504 as the centre of the focus area. Compared to determining the terminal's position as a weighted sum of positions, as will be described with reference to FIG. 6 below, determining the terminal's position as the centre of the focus area is computationally less complex, although the accuracy of the terminal's position may be worse. Determining the terminal's position as the centre of the focus area may thus for instance be particularly suited for devices with simple processors and/or desired small power consumption (for instance to ensure long operating times in case of battery-powered devices).

In this case, if also the covariance C of the terminal's position is desired as an output parameter, it may be calculated assuming a uniform distribution over the focus area $\Omega$:

$$C = \frac{1}{\text{Area}(\Omega)} \int_\Omega (x-\tilde{x})(x-\tilde{x})^T dx = \frac{1}{12}\begin{bmatrix} \Delta n^2 & 0 \\ 0 & \Delta e^2 \end{bmatrix},$$

wherein $\tilde{x}$ is the terminal's position (as 2D vector), and $\Delta n$ and $\Delta e$ are height (north-south direction) and width (east-west direction) of the focus area in meters, respectively. If required, for example the CEP50 (Circular Error Probable 50%) figure can also be given by $$CEP_{50\%} \approx 0.59\left(\sqrt{\frac{\Delta n^2}{12}} + \sqrt{\frac{\Delta e^2}{12}}\right),$$

and in case of CEP68, simply the factor 0.59 above has to be replaced by 0.76.

Finally, the steps of FIG. 5 can be mapped to the components of processor 20 of FIG. 2b as follows: steps 501, 502 and 503 are performed by focus area determination unit 200 of processor 20, and step 504 is performed by centre determination unit 202 of position determination block 201 of processor 20.

FIG. 6 depicts a further flowchart of an exemplary embodiment of a method according to the present invention. Therein, in contrast to the flowchart of FIG. 5, the terminal's position is determined based on the focus area not as the centre thereof, but based on numerical integration, which usually produces a superior result with respect to accuracy.

Before the single steps of FIG. 6 are discussed, the principle of numerical integration will be explained.

Numerical integration, such as the Monte Carlo (MC) simulation that will be exemplarily considered in the following, sets out from a plurality of positions that are distributed in the focus area, for instance according to a random or pseudo-random distribution or according to a pre-defined regular or irregular grid. For instance, the positions can be distributed in the focus area according to a Halton sequence, which is described in Appendix A.1 below. Each position is multiplied by a weight (which will be further explained below), and the weighted positions are then summed up to yield an estimate of the terminal's position.

In more detail, define the set of m areas $E=\{E_1, E_2, \ldots, E_m\}$, and the set of k positions $p=\{p_1, p_2, \ldots, p_k\}$, wherein the positions of the set p are all in the focus area. For each combination of areas in E and positions in p, a distance $D_{ij}(E_j,p_i)$ is determined according to a specific definition. For instance, in case of elliptical areas $E_j$ that are defined in terms of their centre $c_j$ and matrix $A_j$ (defining the semi-major and semi-minor axes), this "elliptical" distance is defined as $$D_{ij}(E_j,p_i) = \sqrt{(p_i-c_j)^T A_j (p_i-c_j)}.$$

For $D_{ij}(E_j,p_i)<1$, the position $p_i$ is within the elliptical area $E_j$, for $D_{ij}(E_j,p_i)=1$, the position $p_i$ is on the boundary of the elliptical area $E_j$, and for $D_{ij}(E_j,p_i)>1$, position $p_i$ is outside the elliptical area $E_j$.

The MC simulation thus produces k*m distances $D_{ij}(E_j,p_i)$.

It is then assumed that distances are connected to the terminal's position estimate $\tilde{p}$ and covariance C through weight functions as follows:

$$\tilde{p} = E(p) = \sum_i^k w_i p_i \quad (1)$$

$$C = V(p) = \frac{1}{k-1}\sum_i^k (w_i p_i - \tilde{p})(w_i p_i - \tilde{p})^T,$$

with $$w_i = \prod_{j=1}^m w_{ij}(D_{ij}(E_j, p_i)) \quad (2)$$

and $$\sum_i^k w_i = 1. \quad (3)$$

Therein, the weights $w_{ij}(D_{ij}(E_j,p_i))$ depend on the distance between the position $p_i$ and the area $E_j$, as will be further defined below. For a specific position $p_i$, multiplying all the weights $w_{ij}(D_{ij}(E_j,p_i))$ over the m ellipses yields the weight $w_i$.

When the position estimate $\tilde{p}$ has been obtained, also for instance the 68% confidence (CEP68) circle may be easily calculated by taking $\tilde{p}$ as the centre of this circle, computing the distance of each position pi from this centre, and taking the 68th percentile of the distances as the radius for the CEP68 circle.

Now, returning to FIG. 6, the steps 600-602 and 606 of the flowchart correspond to steps 500-503 of the flowchart of FIG. 5, respectively. That means that a set of areas is obtained (step 600), and it is checked if an intersection for all areas in this set of areas is potentially non-empty (step 601). If this is found to be true, the focus area is defined as the intersection of the bounding boxes of the areas in the set of areas (step 602). Otherwise, the focus area is defined as the bounding box of a subset of the union of areas in the set of areas, for instance according to one of the three exemplary approaches described in the description of step 503 above.

However, in case that the intersection of all areas in the set of areas is potentially non-empty, in step 603, so-called "hard" (e.g. binary) weights $w_{ij}(D_{ij}(E_j,p_i))$ are determined for all positions $p_i$ in the set of positions p distributed in the focus area determined in step 602.

Figure 13A:
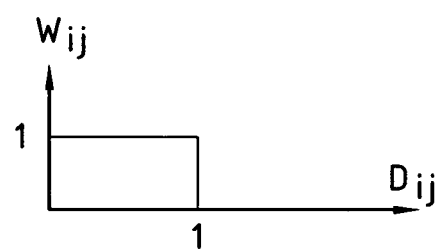
FIG. 13a: an illustration of an exemplary definition of a "hard" weight.

FIG. 13a shows an example of a definition of such "hard" (e.g. binary) weights $w_{ij}(D_{ij}(E_j,p_i))$ as a function of the distance $D_{ij}(E_j,p_i)$ between a position $p_i$ and an elliptical area $E_j$. It is readily seen that $w_{ij}(D_{ij}(E_j, p_i))$ is equal to 1 for positions $p_i$ that are within the elliptical area $E_j$, and is 0 for positions $p_i$ that are outside the elliptical area $E_j$. Consequently, the weight $w_i$ according to equation (2) above that is to be assigned to a position $p_i$ in the weighted sum of positions (see equation (1) above) will only be non-zero in case that position $p_i$ is within all elliptical areas $E_j$ in the set of areas E. In other words, a position $p_i$ only provides a non-zero contribution to the weighted sum of equation (1) above, and thus to the estimated terminal's position, if it is within all areas $E_j$ of the set of areas E.

The rationale behind this approach is that, if it is known that an intersection of all areas exists, the best result will be obtained by using a hard weighting (see FIG. 13a). Then only positions $p_i$ within the intersection of all areas $E_j$ contribute to the terminal's position, and the terminal's position is then obtained accurately. Thus if it is determined in step 601 that an intersection is potentially non-empty, it is instructive first to attempt to determine the terminal's position based on hard weighting (see steps 602 and 603) and on a focus area that corresponds to the intersection of the bounding boxes of all areas, since if an intersection of the areas exists, it is contained in the intersection of the bounding boxes, and then the hard weighting produces the best position estimate. This would for instance be the case for the scenario of FIG. 9a.

The case that an intersection is potentially non-empty, but that actually no intersection of all areas exists, as illustrated in FIG. 9b, is backed-up for by step 604 of the flowchart of FIG. 6, which checks if all weights $w_i$ are equal to zero. Since the weights $w_i$ are only non-zero if the corresponding position $p_i$ is within the intersection of all areas $E_j$, and since such an intersection does not exist in FIG. 9b, there thus cannot be any non-zero weights $w_i$.

In case of all "hard" weights $w_i$ being zero, the flowchart of FIG. 6 jumps to step 607, where "soft" weights $w_i$ are determined for all positions $p_i$ in the set of positions p, based on an different relationship between the weights $w_{ij}(D_{ij}(E_j, p_i))$ and the distance $D_{ij}(E_j, p_i)$ between a position $p_i$ and an area $E_j$.

Figure 13B:
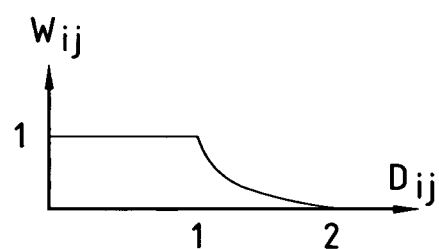
FIG. 13b: an illustration of an exemplary definition of a "soft" weight.
Figure 13C:
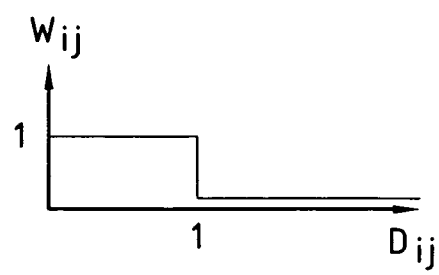
FIG. 13c: an illustration of a further exemplary definition of a "soft" weight.

FIGS. 13b and 13c show examples of definitions of such "soft" weights $w_{ij}(D_{ij}(E_j,p_i))$ as a function of the distance $D_{ij}(E_j, p_i)$ between a position $p_i$ and an elliptical area $E_j$.

With respect to FIG. 13b, it is readily seen that $w_{ij}(D_{ij}(E_j, p_i))$ is equal to 1 for positions $p_i$ that are within the elliptical area $E_j$ ($D_{ij}(E_j,p_i) \leq 1$), but is no longer 0 for positions $p_i$ that are outside the elliptical area $E_j$ ($D_{ij}(E_j,p_i) > 1$), as it is the case in FIG. 13a. Instead, the magnitude of the weight exponentially decays until an exemplary distance of $D_{ij}(E_j,p_i)=2$, and only then becomes zero.

With respect to FIG. 13c, it is seen that $w_{ij}(D_{ij}(E_j,p_i))$ is equal to 1 for positions $p_i$ that are within the elliptical area $E_j$ ($D_{ij}(E_j,p_i) \leq 1$), and takes a small constant (non-zero) tail value for positions $p_i$ that are outside the elliptical area $E_j$ ($D_{ij}(E_j, p_i) > 1$).

When using such "soft" weights as exemplarily presented with reference to FIGS. 13b and 13c, thus the weights $w_i$ also take non-zero values if the respective position $p_i$ is not in the intersection of all areas in the set of areas E. These "soft" weights are thus based on the rationale that, if an intersection of all areas does not exist (e.g. in case that the checking in step 604 is positive), some compromise for the determination of the terminal's position has to be found that still attempts to consider the position information of all areas in the set of areas. As can for instance be seen from the weight definition in FIG. 13b and the definition of the weight $w_i$ in equation (2) above, positions $p_i$ that are in or close to many areas of the set of areas will have comparably large weights $w_i$, whereas positions $p_i$ that are outside and far apart from many areas of the set of areas will have comparably small weights $w_i$. When summing up the weighted positions according to equation (1) above, thus the positions within/close to areas in the set of areas have much more impact on the terminal's position estimate as compared to positions that are outside/far apart from the areas in the set of areas.

As can be seen from step 607 of FIG. 6, soft weights $w_i$ are also determined for all positions $p_i$ in the set of positions p distributed in the focus area in case that the intersection of all areas of the set of areas is not found in step 601 to be potentially non-empty. However, the set of positions p then is distributed in the focus area determined in step 606, and not in the focus area determined in step 602.

When a focus area is determined in step 606 as bounding box around a subset of the union of areas in the set of areas (for instance according to one of the three approaches described above), it is generally not known, what this focus area contains. It can only be stated that the focus area may contain, for example, "an intersection for the majority of the areas in the set of areas". Hence the focus area is still suitable for the MC simulation. However, because an intersection of all areas does not exist and all the areas may be preferred to be included in the determination of the terminal's position (for instance because it may be impossible to say which area/areas in the set of areas are incorrect) one may have to rely on soft weights as defined in FIGS. 13b and 13c.

Using soft weights in the exemplary scenario of FIG. 9b (e.g. soft weights as defined in FIG. 13b), all the positions $p_i$ in focus area 92 would be assigned a non-zero weight $w_i$, and a position (and also an error estimate) can be obtained despite the intersection of all areas being empty.

In case of FIG. 11b, the positions $p_i$ in the intersection of areas 110, 111 and 113 (which is within the focus area 118) then would have the greatest weights $w_i$, because they lie in the intersection of three (out of four) areas. Moreover, although the area 112 is taken into account in the calculation of the terminal's position through small weights $w_{ij}(D_{ij}(E_j, p_i))$ associated with the distance from the area 112 to the positions $p_i$ in the focus area 118, these weights are so small that they do not bias the estimate of the terminal's position; the estimate would still lie close to the intersection of the three areas 110, 111 and 113. In the scenario shown in FIG. 11b, the soft weights therefore emphasize the intersection of areas 110, 111 and 113 in the position calculation, but also takes into account the characteristics of the area 112 by small weights.

Note however that, depending upon the specific definition used for the soft weights, the weights may still be all zero. For example, in the case shown in FIG. 11b, if the ellipse 112 is sufficiently far away from the focus area 118, the exponential decay of the tail in FIG. 13b may still force all the weights to zero. In contrast, the constant tail approach in FIG. 13c would lead to non-zero weights in all the circumstances.

Depending on the definition of the soft weights (e.g. in case of FIG. 13c), no area may thus be excluded from the calculation of the terminal's position. Areas may be excluded when defining the focus area (the sample area for the MC simulation) in step 606, but once an MC simulation is performed, each coverage area may be taken into account through the soft weights. This may be a preferred implementation, because it may be impossible to know (in most cases) which areas are incorrect, but the use of the soft weights will eventually lead to a reasonably good position estimate, because the areas far away from the majority of areas can affect the final position estimate only by a small amount.

In summary, the flowchart of FIG. 6 thus allows for a robust and efficient determination of a terminal's position, irrespective of whether an intersection of all areas in the set of areas exists or not. In the former case, the best position estimate is obtained based on numerical integration with hard weighting in a focus area defined around the intersection. In the latter case, the position estimate is obtained based on numerical integration with soft weighting in a specific focus area in a way that the position estimate still tends to be found in a region with a "high density" of areas from the set of areas.

In the description of the exemplary method of FIG. 6 above, it was assumed that a TA measurement can be considered in the determination of the terminal's position by representing the TA measurement as a maximum distance area (e.g. a circle) that constitutes one of the areas in the set of areas E, i.e. no differentiation is made between the maximum distance circle and the other coverage models contained in the set of areas E. The maximum distance (TA-based) area may then for instance be considered when determining the focus area and when performing the MC simulation. The weights $w_{ij}(D_{ij}(E_j,p_i))$ (either in hard or soft form) are then computed irrespective whether the area $E_j$ represents a coverage area of a communication node or a maximum distance (TA-based) area.

Alternatively, a TA-measurement may be considered in the MC simulation by defining a dedicated weight $w_i^{TA}(p_i)$ related to a TA measurement between the terminal the position of which is to be determined and a communication node. In this case, an area representing a maximum distance derived from the TA measurement is not included in the set of areas E that are considered in the MC simulation. Nevertheless, such a maximum distance area may still be considered when determining if an intersection of all areas (including the maximum distance area) is potentially non-empty and when determining a focus area. The number of areas considered in the determining if an intersection of all areas of a set of areas is potentially non-empty and in the determining of a focus area may thus be larger or equal to the number of areas considered when performing the MC simulation to determine the terminal's position.

Now, when using such a dedicated weight $w_i^{TA}(p_i)$, distances are assumed to be connected to the terminal's position estimate $\tilde{p}$ and covariance C through weight functions as follows:

$$\tilde{p} = E(p) = \sum_i^k w_i^{TA}(p_i) w_i p_i$$

$$C = V(p) = \frac{1}{k-1} \sum_i^k (w_i^{TA}(p_i) w_i p_i - \tilde{p})(w_i^{TA}(p_i) w_i p_i - \tilde{p})^T,$$

with the weights $w_i$ being defined as in equation (2) above, and the weights $w_i^{TA}(p_i)$ being defined as:

$$w_i^{TA}(p_i) = \exp\left(-\frac{1}{2} \frac{(\|p_i - x_{CN}\| - TA \cdot 550)}{\sigma_{quantization}^2 + \sigma_{TA}^2}\right),$$

and the normalization of equation (3) above being replaced by the following normalization:

$$\sum_i^k w_i^{TA}(p_i) w_i = 1.$$

Therein, TA is the TA measurement of the terminal the position of which is to be determined with respect to a communication node at position $x_{CN}$, $\sigma_{TA}^2$ is the measurement variance, and $\sigma_{quantization}^2$ is the extra variance due to quantization of the TA measurement. Assuming a uniform distribution over the 550 m range (the resolution of the TA measurements, see FIG. 7), $\sigma_{quantization}^2$ can be shown to be (160 m)$^2$, when the distribution is approximated as Gaussian. The derivation of the definition of the weight $w_i^{TA}(p_i)$ is presented in Appendix A.2.

It should also be noted that the TA measurement and the associated weight $w_i^{TA}(p_i)$ is used here as an example only, but may be replaced by any distance measurement (such as measurements related to timing in general, and/or measurements related to signal attenuation, etc.) and an accordingly associated weight. Furthermore, there may also be more than one distance measurement, although the above equations only exemplarily assume one distance measurement (for the exemplary case of a TA measurement to the serving GSM base station).

The steps of the flowchart of FIG. 6 can be mapped to the components of processor 20 of FIG. 2b as follows: steps 601, 602 and 606 are performed by focus area determination block 200 of processor 20. Steps 603, 604 and 607 are performed by weight calculation unit 203, based on a plurality of positions in the focus area generated by position generation block 204, both of which are blocks of position determination block 201 of processor 20. Step 605 is implemented by multiply$\sum$ unit 205 of position determination block 201 of processor 20.

Figure 14A:
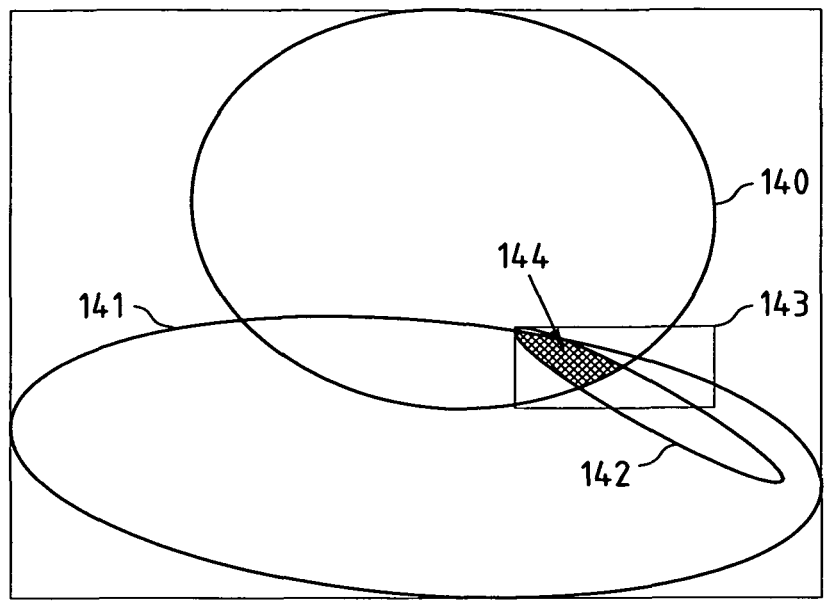
FIG. 14a: a schematic illustration of areas that have a non-empty intersection.
Figure 14B:
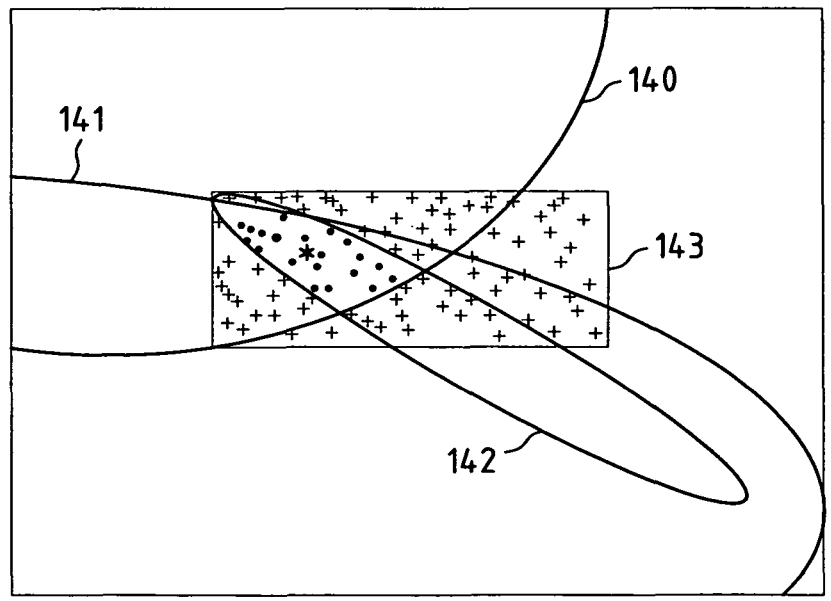
FIG. 14b: a schematic illustration of an application of numerical integration with "hard" weights in a focus area around a non-empty intersection of areas according to the present invention.

As an example of the functioning of the flowchart of FIG. 6, FIGS. 14a (large scale) and 14b (small scale) show a scenario where three elliptical areas 140-142, which may for instance correspond to coverage areas of three communication nodes, are found to have a potentially non-empty intersection (see step 601 of FIG. 6), so that the focus areas is defined as the intersection 143 of the bounding boxes of all three areas 140-142. A plurality of positions $p_i$ is then distributed in this focus area, and hard weights $w_i$ are determined for each of these positions $p_i$ (see step 603). Since an intersection 144 of the three areas exists, not all weights $w_i$ are zero (see step 604). This is indicated in FIG. 14b by the crosses and dots. The crosses are positions $p_i$ that are not within all areas 140-142 and thus are assigned a zero weight $w_i$. The dots are positions $p_i$ that are within all areas 140-142 and thus are assigned non-zero weights $w_i$. The dots then contribute to the determining of the terminal's position (see step 605), which is depicted as star in FIG. 14b.

APPENDIX A.1

Halton Sequence

A Halton sequence is a maximum discrepancy sequence generated in the 2D unit square. The sequences for x and y coordinates are generated separately with different prime bases, for instance 2 and 3, as follows:

I is the index of the number to be generated.
H is the output.
P is the prime base (2 for the first coordinate, 3 for the second)
H=0
divider=1/P
do while (I is not zero)
digit=mod(I,P)
H=H+digit*divider;
I=(I−digit)/P
divider=divider/P
end
The resulting first ten points are:

$$\begin{bmatrix} 0.5 & 0.33333 \\ 0.25 & 0.66667 \\ 0.75 & 0.11111 \\ 0.125 & 0.44444 \\ 0.625 & 0.77778 \\ 0.375 & 0.22222 \\ 0.875 & 0.55556 \\ 0.0625 & 0.88889 \\ 0.5625 & 0.037037 \\ 0.3125 & 0.37037 \end{bmatrix}.$$

The Halton sequence can be transformed to cover any rectangle by multiplying each coordinate in the first and second columns with the width and height of the rectangle, respectively, and then adding the coordinates of the lower left corner of the focus area.

APPENDIX A.2

Derivation of TA-Related Weight

With respect to the TA parameter illustrated in FIG. 7, there may be some error in the coordinates of the communication node, and also the signal path between the measuring terminal and the communication node may not be line-of-sight. Say the noise due to these errors is approximately normally distributed with variance $\sigma_{TA}^2$. Denoting the standard normal Cumulative Density Function (CDF) with $\Phi(\cdot)$, the measurement likelihood for the different TA ranges shown in FIG. 7 is $$p(y|x) = \begin{cases} \Phi\left(\frac{225-x}{\sigma_{TA}}\right) - \Phi\left(\frac{0-x}{\sigma_{TA}}\right), & \text{when } y = 0 \\ \Phi\left(\frac{775-x}{\sigma_{TA}}\right) - \Phi\left(\frac{225-x}{\sigma_{TA}}\right), & \text{when } y = 1 \\ \Phi\left(\frac{1325-x}{\sigma_{TA}}\right) - \Phi\left(\frac{0775-x}{\sigma_{TA}}\right), & \text{when } y = 2 \\ \ldots \end{cases}$$

$$= \begin{cases} \Phi\left(\frac{225-x}{\sigma_{TA}}\right) - \Phi\left(\frac{0-x}{\sigma_{TA}}\right), & \text{when } y = 0 \\ \Phi\left(\frac{550\left(y+\frac{1}{2}\right)-x}{\sigma_{TA}}\right) - \Phi\left(\frac{550\left(y-\frac{1}{2}\right)-x}{\sigma_{TA}}\right), & \text{when } y \geq 1 \end{cases}$$

Since computation of normal CDF is somewhat slow, this may be approximated with $$p(y|x) \approx N(y \cdot 550 \text{ m}, \sigma_{TA}^2 + \sigma_{quantization}^2),$$

where $\sigma_{quantization}^2$ is the additional variance caused by the quantization. This is the approximation used for the definition of the TA-related weights $w_i^{TA}(p_i)$.

It is readily clear for a person skilled in the art that the logical blocks in the schematic block diagrams as well as the flowchart and algorithm steps presented in the above description and its appendices may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims. It should also be understood that the sequence of all method steps presented above is not mandatory, also alternative sequences may be possible.

It should be noted that, although aspects of the present invention were exemplarily presented in the context of elliptical areas, the present invention is not limited to elliptical areas only. For instance, in case of polygonal areas (for instance including, but not being limited to triangular, rectangular and hexagonal areas), bounding boxes can be determined in a straightforward way, and it is also straightforward to evaluate if a position is within the polygonal area, so that hard and/or soft weighting can be performed as well. Therein, the distance of a position with respect to a polygonal area can be defined in a plurality of ways, for instance as the distance to the closest border point of the polygonal area, or the distance to the centre position of the polygonal area (e.g. the centre of mass of the polygonal area).

Furthermore, the areas do not necessarily have to be convex areas. For instance, if there are holes or recesses in the areas, these holes/recesses may be neglected when determining the focus area and may only be considered when performing the numerical integration. Equally well, the holes/recesses may be neglected in both the determination of the focus area and the numerical integration, to name but a few possibilities.

Finally, as already mentioned above, although aspects of the present invention were exemplarily presented in the context of 2D areas, the present invention is equally well also applicable to 3D areas.

The invention claimed is:

1. An apparatus comprising:
   a processor, and
   a memory, said memory storing a program comprising program code, said memory and said program configured to, with said processor, cause said apparatus, when said program is executed on said processor, to perform checking if an intersection of all areas of a set of areas that are associated with one or more communication nodes and represent and/or limit possible positions of a terminal is potentially non-empty, wherein each of said areas is associable with a respective bounding box that is one of a rectangle and a rectangular cuboid, wherein said intersection is defined to be potentially non-empty if an intersection of all of said bounding boxes would be non-empty, and wherein said checking if an intersection of all areas of said set of areas is potentially non-empty is performed based on a coordinate system, which defines a first axis and a second axis being orthogonal to the first axis, by:
   determining, for each area in said set of areas, the largest coordinate component with respect to the first axis and selecting the smallest of these largest coordinate components as a first value;
   determining, for each area in said set of areas, the smallest coordinate component with respect to the first axis and selecting the largest of these smallest coordinate components as a second value;
   determining, for each area in said set of areas, the largest coordinate component with respect to the second axis and selecting the smallest of these largest coordinate components as a third value;
   determining, for each area in said set of areas, the smallest coordinate component with respect to the second axis and selecting the largest of these smallest coordinate components as a fourth value and considering said intersection to be potentially non-empty if said first value is larger than or equal to the second value and said third value is larger than or equal to the fourth value;

and further configured to cause said apparatus, when said program is executed on said processor, to perform determining a position of said terminal in dependence on a result of the checking if said intersection of all areas of said set of areas is potentially non-empty.

2. The apparatus according to claim 1, wherein said memory and said program are configured to, with said processor, cause said apparatus, when said program is executed on said processor, to perform determining said position of said terminal by determining a focus area; and by determining said position of said terminal based on said focus area.

3. The apparatus according to claim 2, wherein said memory and said program are configured to, with said processor, cause said apparatus, when said program is executed on said processor, to perform at least one of determining at least said focus area in dependence on said result of said checking whether said intersection of all areas of said set of areas is potentially non-empty, determining, in case that said intersection of all areas of said set of areas is found to be potentially non-empty, said focus area to represent said intersection of all of said bounding boxes associable with said areas of said set of areas, and determining, in case that said intersection of all areas of said set of areas is not found to be potentially non-empty, said focus area by:

excluding one or more areas from said set of areas to obtain a reduced set of areas;

checking if an intersection of all areas of said reduced set of areas is potentially non-empty, wherein each of said areas of said reduced set of areas is associable with a respective bounding box, and wherein said intersection is defined to be potentially non-empty if an intersection of all of said bounding boxes associable with said areas of said reduced set of areas would be non-empty; and determining, in case that said intersection of all areas of said reduced set of areas is found to be potentially non-empty, said focus area to represent said intersection of all of said bounding boxes associable with said areas of said reduced set of areas.

4. The apparatus according to claim 2, wherein said memory and said program are configured to, with said processor, cause said apparatus, when said program is executed on said processor, to perform determining, in case that said intersection of all areas of said set of areas is not found to be potentially non-empty, said focus area based on a coordinate system, which defines a first axis and a second axis being orthogonal to the first axis, by:

choosing a variable n equal to 2;

selecting, as a first value, the n-th smallest coordinate component with respect to said first axis from a set containing, for each area in said set of areas, the largest coordinate component with respect to said first axis;

selecting, as a second value, the n-th largest coordinate component with respect to said first axis from a set containing, for each area in said set of areas, the smallest coordinate component with respect to said first axis;

selecting, as a third value, the n-th smallest coordinate component with respect to said second axis from a set containing, for each area in said set of areas, the largest coordinate component with respect to said second axis;

selecting, as a fourth value, the n-th largest coordinate component with respect to said second axis from a set containing, for each area in said set of areas, the smallest coordinate component with respect to said second axis;

checking if said first value is larger than or equal to the second value and said third value is larger than or equal to the fourth value;

forming said focus area as a rectangle the sides of which are defined by said first and second value with respect to said first axis and by said third and fourth values with respect to said second axis, if said first value is larger than or equal to the second value and said third value is larger than or equal to the fourth value; and increasing n and repeating said selecting and checking otherwise, until a focus area is formed.

5. The apparatus according to claim 2, wherein said memory and said program are configured to, with said processor, cause said apparatus, when said program is executed on said processor, to perform determining, in case that said intersection of all areas of said set of areas is not found to be potentially non-empty, said focus area based on a coordinate system, which defines a first axis and a second axis being orthogonal to the first axis, by:

if a first value representing the smallest coordinate component with respect to said first axis from a set containing, for each area in said set of areas, the largest coordinate component with respect to said first axis is larger than or equal to a second value representing the largest coordinate component with respect to said first axis from a set containing, for each area in said set of areas, the smallest coordinate component with respect to said first axis, maintaining said first value and said second value, and otherwise:

choosing a variable n equal to 2;

checking if the n-th smallest coordinate component with respect to said first axis from a set containing, for each area in said set of areas, the largest coordinate component with respect to said first axis is larger than or equal to the n-th largest coordinate component with respect to said first axis from a set containing, for each area in said set of areas, the smallest coordinate component with respect to said first axis;

if the checking is positive, maintaining said n-th smallest coordinate component as said first value and maintaining said n-th largest coordinate value as said second value, if the checking is negative, incrementing n and repeating the checking, until said first and second value can be maintained;

if a third value representing the smallest coordinate component with respect to said second axis from a set containing, for each area in said set of areas, the largest coordinate component with respect to said second axis is larger than or equal to a fourth value representing the largest coordinate component with respect to said second axis from a set containing, for each area in said set of areas, the smallest coordinate component with respect to said second axis, maintaining said third value and said fourth value, and otherwise:

choosing a variable m equal to 2;

checking if the m-th smallest coordinate component with respect to said second axis from a set containing, for each area in said set of areas, the largest coordinate component with respect to said second axis is larger than or equal to the m-th largest coordinate component with respect to said second axis from a set containing, for each area in said set of areas, the smallest coordinate component with respect to said second axis;

if the checking is positive, maintaining said m-th smallest coordinate component as said third value and maintaining said m-th largest coordinate value as said fourth value, if the checking is negative, incrementing m and repeating the checking, until said third and fourth value can be maintained;

forming said focus area as a rectangle the sides of which are defined by said first and second value with respect to said first axis and by said third and fourth values with respect to said second axis.

6. The apparatus according to claim 2, wherein said memory and said program are configured to, with said processor, cause said apparatus, when said program is executed on said processor, to perform at least one of determining said position of said terminal as the centre of said focus area, and determining said position of said terminal based on a weighted sum of positions that are distributed within said focus area.

7. The apparatus according to claim 6, wherein said memory and said program are configured in a way that at least an initially used definition of weights to be multiplied by said positions in said weighted sum of positions depends on said result of said checking whether said intersection of all areas of said set of areas is potentially non-empty.

8. The apparatus according to claim 6, wherein said memory and said program are configured in a way that, in case that said intersection of all areas of said set of areas is found to be potentially non-empty, a definition of said weights to be multiplied by said positions in said weighted sum of positions is at least initially used that causes only weights that are to be multiplied by positions that are inside all areas of said set of areas or inside all areas of a pre-defined sub-set of said set of areas to be non-zero.

9. The apparatus according to claim 8, wherein said memory and said program are configured in a way that, in case that all of said weights that are to be multiplied by said positions in said weighted sum of positions would be zero according to said at least initially used definition, an alternative definition of said weights to be multiplied by said positions in said weighted sum of positions is used that also allows weights that are to be multiplied by positions that are not inside all areas of said set of areas or not inside all areas of said pre-defined sub-set of said set of areas to be non-zero.

10. The apparatus according to claim 6, wherein said memory and said program are configured in a way that, in case that said intersection of all areas of said set of areas is not found to be potentially non-empty, a definition of said weights to be multiplied by said positions in said weighted sum of positions is used that also allows weights that are to be multiplied by positions that are not inside all areas of said set of areas or not inside all areas of a pre-defined sub-set of said set of areas to be non-zero.

11. The apparatus according to claim 6, wherein said memory and said program are configured in a way that weights to be multiplied by said positions in said weighted sum of positions depend on a distance-related measurement of said terminal the position of which is to be determined with respect to a communication node.

12. The apparatus according to claim 1, wherein said apparatus is embodied as at least one of a module, a portable electronic device and an apparatus comprising at least one of a user interface and an antenna.

13. The apparatus according to claim 1, wherein each of said areas is one of an ellipse, a circle, a polygon, an ellipsoid, a sphere and a polyhedron.

14. A method comprising:

checking if an intersection of all areas of a set of areas that are associated with one or more communication nodes and represent and/or limit possible positions of a terminal is potentially non-empty, wherein each of said areas is associable with a respective bounding box that is one of a rectangle and a rectangular cuboid, wherein said intersection is defined to be potentially non-empty if an intersection of all of said bounding boxes would be non-empty, and wherein said checking if an intersection of all areas of said set of areas is potentially non-empty is based on a coordinate system, which defines a first axis and a second axis being orthogonal to the first axis, and comprises:

determining, for each area in said set of areas, the largest coordinate component with respect to the first axis and selecting the smallest of these largest coordinate components as a first value;

determining, for each area in said set of areas, the smallest coordinate component with respect to the first axis and selecting the largest of these smallest coordinate components as a second value;

determining, for each area in said set of areas, the largest coordinate component with respect to the second axis and selecting the smallest of these largest coordinate components as a third value;

determining, for each area in said set of areas, the smallest coordinate component with respect to the second axis and selecting the largest of these smallest coordinate components as a fourth value; and considering said intersection to be potentially non-empty if said first value is larger than or equal to the second value and said third value is larger than or equal to the fourth value; and said method further comprising:

determining a position of said terminal in dependence on a result of the checking if said intersection of all areas of said set of areas is potentially non-empty.

15. The method according to claim 14, wherein said determining of said position of said terminal comprises:

determining a focus area; and determining said position of said terminal based on said focus area, wherein at least said determining of said focus area depends on said result of said checking whether said intersection of all areas of said set of areas is potentially non-empty, and/or wherein, in case that said intersection of all areas of said set of areas is found to be potentially non-empty, said focus area is determined to represent said intersection of all of said bounding boxes associable with said areas of said set of areas.

16. The method according to claim 15, wherein, in case that said intersection of all areas of said set of areas is not found to be potentially non-empty, said determining of said focus area comprises:

excluding one or more areas from said set of areas to obtain a reduced set of areas;

checking if an intersection of all areas of said reduced set of areas is potentially non-empty, wherein each of said areas of said reduced set of areas is associable with a respective bounding box, and wherein said intersection is defined to be potentially non-empty if an intersection of all of said bounding boxes associable with said areas of said reduced set of areas would be non-empty; and determining, in case that said intersection of all areas of said reduced set of areas is found to be potentially non-empty, said focus area to represent said intersection of all of said bounding boxes associable with said areas of said reduced set of areas.

17. The method according to claim 15, wherein, in case that said intersection of all areas of said set of areas is not found to be potentially non-empty, said focus area is determined based on a coordinate system, which defines a first axis and a second axis being orthogonal to the first axis, and said determining of said focus area comprises:

choosing a variable n equal to 2;

selecting, as a first value, the n-th smallest coordinate component with respect to said first axis from a set containing, for each area in said set of areas, the largest coordinate component with respect to said first axis;

selecting, as a second value, the n-th largest coordinate component with respect to said first axis from a set containing, for each area in said set of areas, the smallest coordinate component with respect to said first axis;

selecting, as a third value, the n-th smallest coordinate component with respect to said second axis from a set containing, for each area in said set of areas, the largest coordinate component with respect to said second axis;

selecting, as a fourth value, the n-th largest coordinate component with respect to said second axis from a set containing, for each area in said set of areas, the smallest coordinate component with respect to said second axis;

checking if said first value is larger than or equal to the second value and said third value is larger than or equal to the fourth value;

forming said focus area as a rectangle the sides of which are defined by said first and second value with respect to said first axis and by said third and fourth values with respect to said second axis, if said first value is larger than or equal to the second value and said third value is larger than or equal to the fourth value; and increasing n and repeating said selecting and checking otherwise, until a focus area is formed.

18. The method according to claim 15, wherein, in case that said intersection of all areas of said set of areas is not found to be potentially non-empty, said focus area is determined based on a coordinate system, which defines a first axis and a second axis being orthogonal to the first axis, and said determining of said focus area comprises:

if a first value representing the smallest coordinate component with respect to said first axis from a set containing, for each area in said set of areas, the largest coordinate component with respect to said first axis is larger than or equal to a second value representing the largest coordinate component with respect to said first axis from a set containing, for each area in said set of areas, the smallest coordinate component with respect to said first axis, maintaining said first value and said second value, and otherwise:

choosing a variable n equal to 2;

checking if the n-th smallest coordinate component with respect to said first axis from a set containing, for each area in said set of areas, the largest coordinate component with respect to said first axis is larger than or equal to the n-th largest coordinate component with respect to said first axis from a set containing, for each area in said set of areas, the smallest coordinate component with respect to said first axis;

if the checking is positive, maintaining said n-th smallest coordinate component as said first value and maintaining said n-th largest coordinate value as said second value, if the checking is negative, incrementing n and repeating the checking, until said first and second value can be maintained;

if a third value representing the smallest coordinate component with respect to said second axis from a set containing, for each area in said set of areas, the largest coordinate component with respect to said second axis is larger than or equal to a fourth value representing the largest coordinate component with respect to said second axis from a set containing, for each area in said set of areas, the smallest coordinate component with respect to said second axis, maintaining said third value and said fourth value, and otherwise:

choosing a variable m equal to 2;

checking if the m-th smallest coordinate component with respect to said second axis from a set containing, for each area in said set of areas, the largest coordinate component with respect to said second axis is larger than or equal to the m-th largest coordinate component with respect to said second axis from a set containing, for each area in said set of areas, the smallest coordinate component with respect to said second axis;

if the checking is positive, maintaining said m-th smallest coordinate component as said third value and maintaining said m-th largest coordinate value as said fourth value, if the checking is negative, incrementing m and repeating the checking, until said third and fourth value can be maintained;

forming said focus area as a rectangle the sides of which are defined by said first and second value with respect to said first axis and by said third and fourth values with respect to said second axis.

19. A non-transitory computer readable medium having a program comprising:

program code for performing the method according to claim 14, when said program is executed on a processor.

20. The method according to claim 14, wherein each of said areas is one of an ellipse, a circle, a polygon, an ellipsoid, a sphere and a polyhedron.

* * * * *